United States Patent [19]

Sakamoto et al.

[11] Patent Number: 5,218,392
[45] Date of Patent: Jun. 8, 1993

[54] APPARATUS FOR RECORDING POSITION INFORMATION OF PRINCIPAL IMAGE AND PHOTOGRAPHIC PRINTING METHOD USING POSITION INFORMATION

[75] Inventors: Kiichiro Sakamoto; Takaaki Terashita; Keisuke Shiba; Jin Murayama, all of Kanagawa, Japan

[73] Assignee: Fuji Photo Film Co., Ltd., Kanagawa, Japan

[21] Appl. No.: 879,127

[22] Filed: May 5, 1992

Related U.S. Application Data

[63] Continuation of Ser. No. 554,330, Jul. 19, 1990, abandoned.

[30] Foreign Application Priority Data

Jul. 19, 1989 [JP] Japan .................................. 1-186828
Aug. 11, 1989 [JP] Japan .................................. 1-208834
Aug. 11, 1989 [JP] Japan .................................. 1-208835

[51] Int. Cl.[5] .............................................. G03B 17/24
[52] U.S. Cl. .................................................... 354/106
[58] Field of Search ............... 354/400, 105, 106, 109, 354/432; 355/41; 352/92

[56] References Cited

U.S. PATENT DOCUMENTS

| | | | |
|---|---|---|---|
| 3,490,844 | 1/1970 | Sapp, Jr. | 354/106 |
| 4,075,640 | 2/1978 | Ueda et al. | 354/432 |
| 4,150,882 | 4/1979 | Konick | 352/92 X |
| 4,678,300 | 7/1987 | Beach | 354/106 X |
| 4,965,628 | 10/1990 | Olliver et al. | 355/41 |
| 5,023,656 | 6/1991 | Terashita | 355/41 |
| 5,025,275 | 6/1991 | Taniguchi et al. | 354/106 |
| 5,051,770 | 9/1991 | Cornuejols | 354/432 |

*Primary Examiner*—W. B. Perkey
*Attorney, Agent, or Firm*—Sughrue, Mion, Zinn, Macpeak & Seas

[57] ABSTRACT

The position of a principal image within a frame is designated manually or in association with the operation of the automatic focussing mechanism. The position information of the principal image is recorded on a photographic film when a subject is photographed. In obtaining a photoprint, the position information is read from the frame to be printed, and the principal image within the frame is identified. A characteristic value used for calculating an exposure amount is derived from the identified principal image, so as to execute an exposure control emphasizing the principal image.

4 Claims, 17 Drawing Sheets

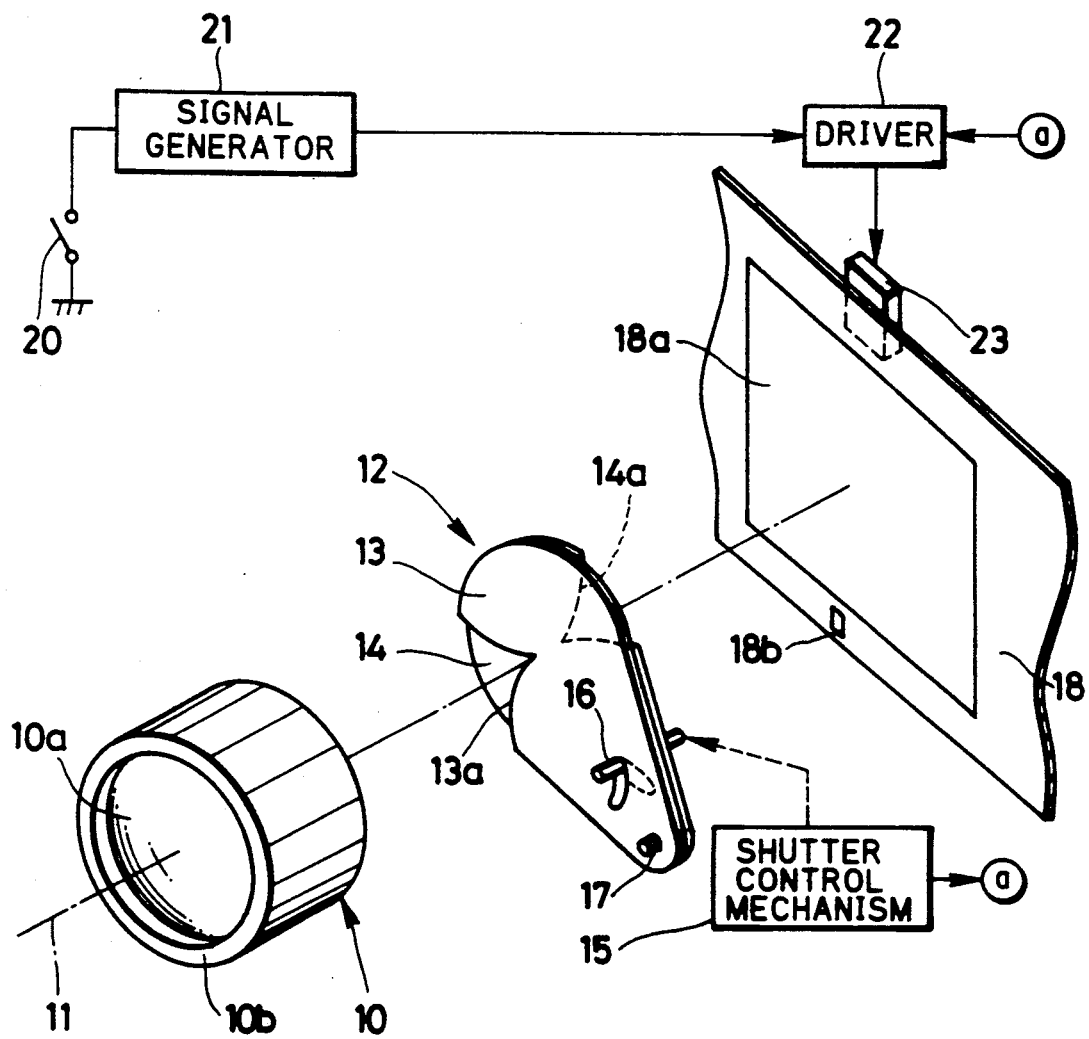
F I G. 1

F I G. 4
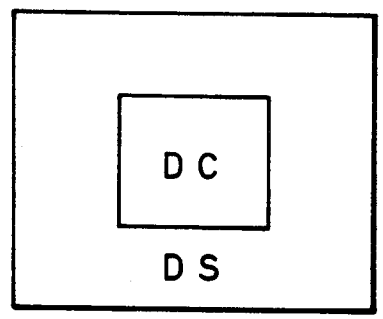

| DU1 | DU2 | DU3 |
|-----|-----|-----|
| DM1 | DM2 | DM3 |
| DL1 | DL2 | DL3 |

APPARATUS FOR RECORDING POSITION INFORMATION OF PRINCIPAL IMAGE AND PHOTOGRAPHIC PRINTING METHOD USING POSITION INFORMATION

This is a continuation of application Ser. No. 07/554,330 filed Jul. 19, 1990, now abandoned.

BACKGROUND OF THE INVENTION

The present invention relates to an apparatus for recording position information of a principal image within a frame, and to a photographic printing method employing exposure control using the position information.

In recent years, the performance of photographic cameras has been improved considerably by automatic exposure control and focussing, and anyone can take a photograph properly. The performance of a photographic film and a photographic printer has also been improved. With such improvement, the quality of finished photoprints is quite excellent. According to a conventional photographic printing method, however, the photographing conditions and a photographer's intent are estimated from an image recorded on a photographic film, so that a finished photoprint in some cases may become unsatisfactory for the photographer.

In order to make photoprints matching the photographer's intent, there is a known camera capable of recording various information on a photographic film, such as a date and time of photographing, shutter speed, f-number and the like (e.g., Japanese Patent Laid-open Publication Nos. 51-117632, 59-214023, Japanese Utility Laid-open Publication No. 63-188644, Japanese Patent Laid-open Publication Nos. 64-6933, 63-201645, 49-74019, 55-101932, and 54-2115, and the like).

There also is a known photographic camera capable of recording illumination light type information (e.g., Japanese Patent Laid-open Publication Nos. 51-117632, 52-1333, 52-30429, and the like). Further, there is a known photographic camera capable of recording trimming information (e.g., Japanese Patent Laid-open Publication Nos. 63-298233, 64-21432, and the like). There also is a known photographic camera capable of recording characters indicating the type or the like of a principal subject (e.g., Japanese Patent Laid-open Publication Nos. 50-30517, 55-101932, 54-2115, and the like).

Various images in addition to a principal subject image (principal image) are recorded in one frame. It is known empirically that photographers will be satisfied if a principal image reproduced on a color paper has a proper density and color balance regardless of whether other images are finished improperly to some degree. It is not possible to identify a principal image within a frame of a photographic film taken with a conventional camera. There is a known method of determining the exposure amount which results in a proper reproduction of a principal image by assuming that a principal image is located at the central area of a frame, and using for example a characteristic value obtained by weighting a photometric value at the central area. However, if the principal image is not within the central area of the frame, proper exposure control is impossible.

There is a known photographic film having not only a blue-sensitive silver halide emulsion layer, green-sensitive silver halide emulsion layer, and red-sensitive silver halide emulsion layer, but also such a layer of a different spectral sensitivity from that of the emulsion layers as provides an interlayer effect mainly to the red-sensitive silver halide emulsion layer (e.g., U.S. Pat. Nos. 4,663,271, 4,705,744, and 4,707,436, Japanese Patent Laid-open Publication Nos. 62-160448 and 63-89580).

There is described an effect of improvement on color reproduction at spectrum for a CL layer, in the "Journal of the Society of Photographic Science and Technology of Japan", Vol. 52, No. 1, pages 41–48. This technique provides a remarkably improved effect so long as such a film is printed under printing conditions suitable for realizing improvement of hue and saturation at specific spectrum.

However, it was confirmed that, if the photographic films formed by these techniques are developed and printed under the conditions determined such that other earlier types of photographic films without the above techniques are finished optimally, several tens % of the above improved films do not obtain the effect of such improvement as described above.

It is a principal object of this invention to provide a position information recording apparatus capable of recording the position information of a principal image on a recording medium, the position information being designated manually or detected automatically.

It is another object of the invention to provide a photographic printing method capable of preponderantly improving the quality of a principal image on a photoprint.

It is a further object of the invention to provide a photographic printing method capable of obtaining stable quality of finished photoprints by positively using the color reproduction of a photographic film having a donor layer with a particular interlayer effect.

SUMMARY OF THE INVENTION

The above and other objects and advantages of the invention are achieved by providing means for generating the position information of a principal image within a frame designated manually or detected automatically, and means for recording the position information on a recording medium.

In order to record the position information of a principal image in the simplest manner, it is preferable to use position information indicating whether a principal image is located at the central area of a frame. If a principal image is located at the central area (as is the case for most of the principal images), no position information is recorded, whereas if a principal image is located at the peripheral area, a mark, bar code, character or the like is recorded on a recording medium such as a photographic film. Alternatively, although more complicated, it is possible to use central area information indicating that a principal image is located at the central area, one end area information indicating that a principal image is located at the right or left end area of the frame, the end area information indicating that principal images are located at both right and left end areas of the frame, half frame information indicating that principal images are located at the central area and either at the right or left area, and full frame information indicating that principal images are located at the central area and at the right and left areas. The position of a principal image (e.g., the center of a principal image) may be designated with an X-Y coordinate system, or the area within which a principal image is located may be designated from a plurality of divisional areas in a frame.

According to a preferred embodiment of this invention, a time sequential signal from a principal image at the central area on a focus-lock operation is measured while an image sensor (image area sensor, image line sensor) picks up a subject, and is stored in a memory. This time sequential signal is compared with another time sequential signal picked up from an image sensor in real time during photographing, so as to detect the position of a principal image shifted from the central area. This position after the motion of the principal image is recorded on a recording medium.

According to the photographic printing method of this invention, photoprints whose quality satisfies a photographer can be obtained with a principal image preponderantly printed by using the position information thereof recorded during photographing. According to a preferred embodiment of the photographic printing method of this invention, there is used a color photographic film having a blue-sensitive silver halide emulsion layer (BL), a green-sensitive silver halide emulsion layer (GL), a red-sensitive silver halide emulsion layer (RL), and at least one donor layer having a weight-averaged wavelength of spectral sensitivity different from those of the emulsion layers by 5 nm or larger and providing an interlayer effect. This photographic film is used to make a photoprint with a principal image preponderantly printed by using the position information thereof, resulting in a higher quality of photoprints.

BRIEF DESCRIPTION OF THE DRAWINGS

The above objects and advantages of this invention will become apparent to those skilled in the art from the following detailed description when read in conjunction with the accompanying drawings, in which:

FIG. 1 is a schematic diagram of a photographic camera which records a mark on a photographic film if a principal image is not located at the central area of a frame;

FIG. 4 illustrates the relationship between respective areas of a frame and characteristic values derived therefrom;

DETAILED DESCRIPTION OF THE PREFERRED EMBODIMENTS

Figure 2:
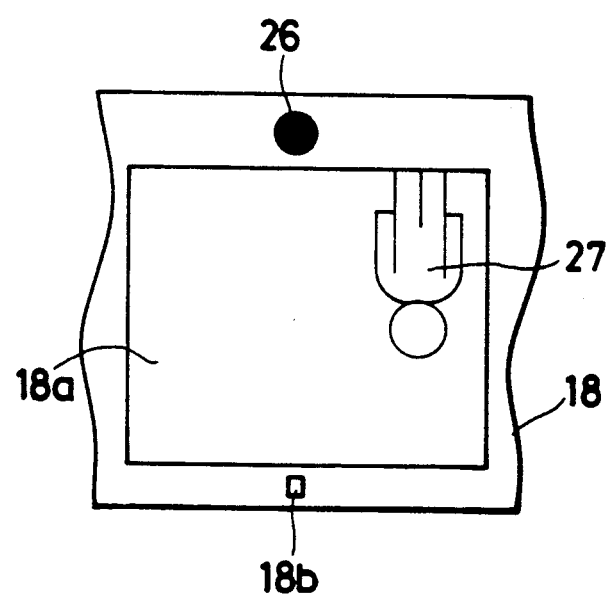
FIG. 2 illustrates a photographic film having an image frame photographed with the camera shown in FIG. 1.

FIG. 1 shows a photographic camera having an apparatus for recording the position information of a principal image. A taking lens 10 is constructed of an optical system 10a and a lens barrel 10b supporting the optical system 10a. The taking lens 10 is moved manually or with an automatic focussing mechanism, back and forth along an optical axis 11 to adjust its focal point. At the back of the taking lens 10, there is disposed a shutter 12 for program control. The shutter 12 is constructed of, e.g., two blades 13 and 14, having respective recesses 13a and 14a formed therein. The shutter blades 13 and 14 are moved by a shutter control mechanism 15 such that they are pivoted in opposite directions about a fixed pin 17, while a movable pin 16 is moved toward the fixed pin 17, thereby making an aperture where the recesses 13a and 14a are superposed one upon another. A light passed through this aperture becomes incident on a photographic film 18 to photograph a subject.

A switch 20 is mounted on the camera body (not shown) at a position accessible by an operator. This switch 20 is actuated if a principal subject such as a person is not located at the center of the frame. Upon actuation of the switch 20, a signal generator 21 generates a signal representing that an image of a principal subject (principal image) is not present at the center of the frame, and sends it to a driver 22. This driver 22 receives a signal from a shutter control mechanism 15 and causes a mark recording mechanism 23 to record central area absence information on the photographic film 18.

FIG. 2 shows an example of a photographic film with the central area absence information recorded thereon. This photographic film 18 is formed, at regular intervals, with perforations 18b which are detected by a sensor of a feed stop device to control feeding of the film one frame at a time. The central area absence information 26, indicating that the principal image 27 is not present in the center of the frame 18a, is recorded on the side opposite the perforations 18b, and is made visible by photographic development. Besides a mark, a bar code, symbol, character or the like may also be used as the central area absence information 26.

Figure 3:
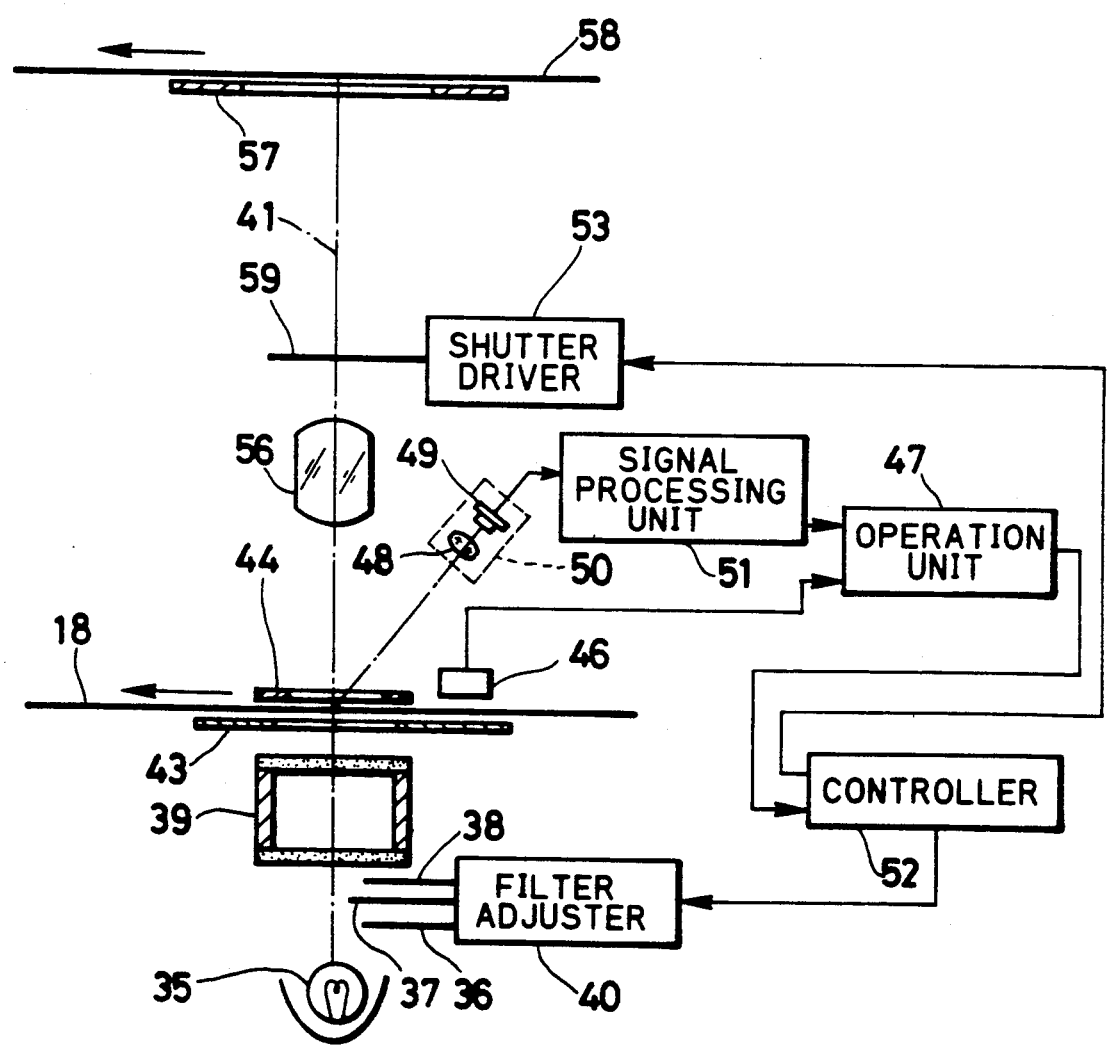
FIG. 3 is a schematic diagram showing an example of a photographic printer for printing the photographic film shown in FIG. 2.

FIG. 3 illustrates a photographic printer, in which white light radiated from a light source 35 passes through a cyan filter 36, a magenta filter 37, and a yellow filter 38, and enters a mixing box 39. The insertion degree of these color correction filters 36 to 38 into an optical path 41 is controlled by a filter adjuster 40 to regulate the three color components and intensities of a printing light. The mixing box 39 is constructed of a rectangular tube having an inner mirror surface and diffusion plates mounted on both opposite ends of the rectangular tube.

A film carrier 43 is set at the printing station. A developed photographic film 18 also is set at the printing station, and is illuminated by the light transmitted through the mixing box 39. A film mask 44 is mounted at the printing station to ensure the flatness of the photographic film 18. This mask 44 is formed with an opening corresponding to the size of a frame, as is well known in the art. The film mask 44 is raised by a solenoid (not shown) while the photographic film 18 is being fed, and is lowered to press the photographic film 18 during the printing operation.

A mark sensor 46 is mounted at a position upstream from the printing station to read the central area absence information 26 recorded for each frame as the photographic film 18 is fed to the printing station, the central area absence information 26 being sent to an operation unit 47. A scanner 50, disposed upstream from and above the printing station, is constructed of a lens 48 and an image area sensor 49, and measures light transmitted through each measurement point of the frame set at the printing station. A signal from the scanner 50 is sent to a signal processing unit 51, where it is subjected to logarithmic and analog/digital conversion. The density signal at each measurement point is sent to the operation unit 47. A controller 52 adjusts the setting positions of the color correction filters 36 to 38 in accordance with the three color printing exposure amounts calculated by the operation unit 47. The controller 52 controls, in addition to the filter adjuster 40, various component circuits such as a shutter driver 53 and the like. A printing lens 56, disposed above the printing station, enlarges and projects an image in a specified frame to a color paper 58 positioned at the back of a paper mask 57. A shutter 59, whose open/close operation is controlled by a shutter driver 53, is disposed between the printing lens 56 and color paper 59.

The operation of this embodiment now will be described. In taking a photograph, a camera is pointed at a subject, and a desired layout is determined. In this case, if a principal image is set at a position displaced from the central area of the frame, the switch 20 is turned on. When this switch 20 is turned on, the signal generator 21 generates a representative signal, and sends it to the driver 22. After the layout is determined, the release button is depressed so that the shutter control mechanism 15 moves the driving pin 16 reciprocally to open and close the shutter 12 to take a photograph. Simultaneously with or immediately after this photographing caused by the shutter control mechanism 15, the signal is sent to the driver 22 which in turn makes the mark recording mechanism 23 record the central area absence information 26 at the peripheral area of the frame 18a. If a principal image is located at the central area, the switch 20 is not actuated, so that no mark is recorded on the photographic film 18.

After all the photographic film 18 is photographed, the film 18 is removed from the photographic camera and is sent to a laboratory. At the laboratory, the film 18 is developed to make visible both frames recorded as latent images and central area absence information selectively recorded as latent images. The developed photographic film 18 is mounted on the film carrier 43 of the photographic printer shown in FIG. 3 to transport the film to the printing station. While the frame to be printed, e.g. the frame 18a, is transported toward the printing station, the central area absence information 26 is read with the mark sensor 46. When the frame 18a is set at the printing station, the scanner 50 measures red, green and blue light transmitted from the frame 18a at each measurement point. These three color photometric values are converted into densities by the signal processing unit 51 and are sent to the operation unit 47. The operation unit 47 calculates a characteristic value $D_i$ (i represents one of red, green and blue colors) from the three color densities at each measurement point in accordance with the presence/absence of the central area absence information 26.

(1) If a principal image is present at the central area of a frame, $$D_i = (K \cdot DC_i + DS_i)/2 \qquad (1)$$

wherein:
  DC: an average density of the central area of the frame shown in FIG. 4;
  DS: an average density of the peripheral area of the frame as shown in FIG. 4; and
  K: a weighting coefficient.

(2) If a principal image is not present at the central area of a frame, $$D_i = (DC_i + K \cdot DS_i)/2 \qquad (2)$$

The obtained characteristic value $D_i$ is substituted in the following equation to calculate a printing exposure amount $E_i$:

$$E_i = \alpha_i (D_i - DN_i) + \beta_i \qquad (3)$$

wherein:
  α: a slope coefficient;
  β: a constant determined from a combination of a photographic film, color paper, printing lens and the like; and DN: an average density of a normal control negative film.

The controller 52 generates a filter setting position signal in accordance with the printing exposure amount $E_i$, and sends it to the filter adjuster 40. The filter adjuster 40 adjusts the insertion amounts of the color correction filters 36 to 38 into the optical path 41. After this filter adjustment, the shutter 59 opens for a predetermined time to print the frame 18a on the color paper 58. In a similar manner, frames of the photographic paper 18 are printed sequentially.

In obtaining the characteristic value $D_i$ from the flesh color density at the area designated in photographing i.e. either the central or peripheral area shown in FIG. 4, calculations for flesh color reproduction are carried out. With this flesh color reproduction process, a facial image of a person can be finished as a natural flesh color so that photoprints satisfying a photographer can be produced in many cases.

Figure 5:
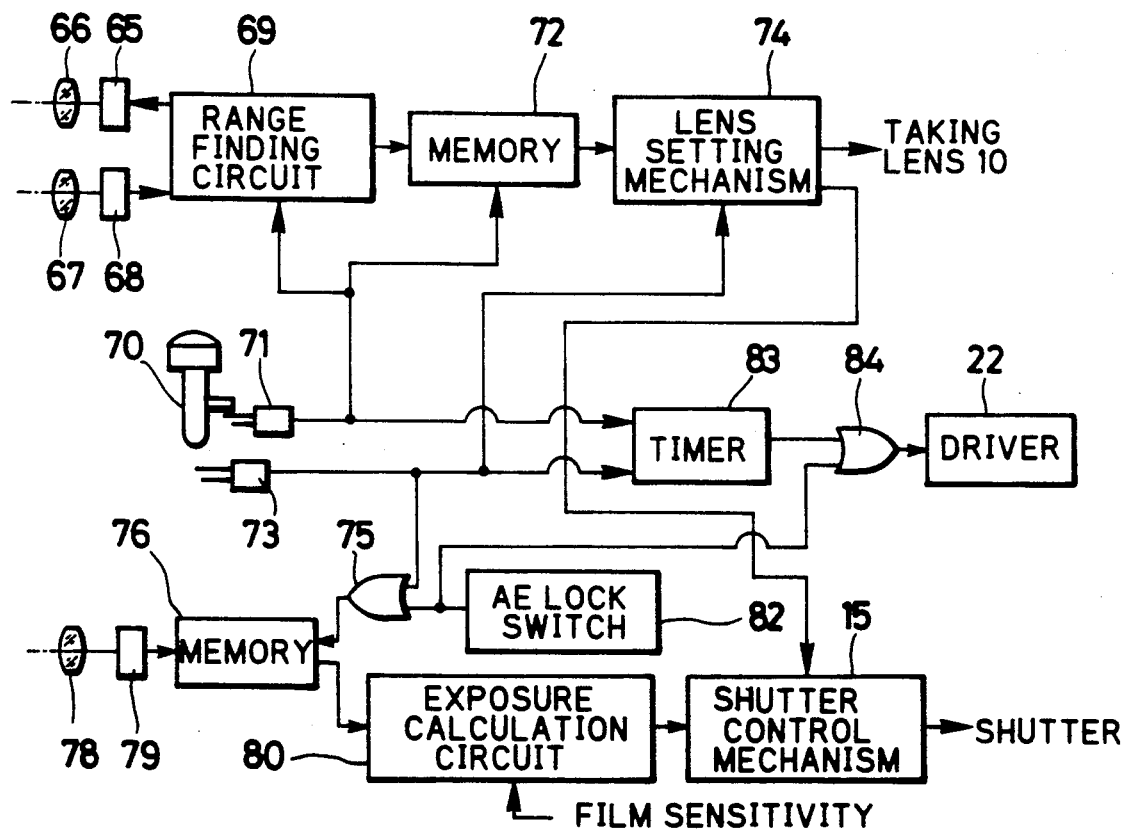
FIG. 5 is a block diagram showing the main part of a photographic camera which records the position information of a principal image by using its focus-lock function and AE-lock function.

FIG. 5 shows an embodiment wherein the central area absence information is recorded on a photographic film upon detection of performing a focus-lock or AE-lock. As is well known in the art at the front surface of a camera body (not shown). there are disposed a projector constructed of a light emitting diode 65 and a lens 66, and a light detector constructed of a lens 67 and a line sensor 68. When a release button 70 is half-depressed and a switch 71 is turned on, a range finding circuit 69 causes the light emitting diode to throw a near infrared spot light to a subject. The position of the reflected light incidence on the line sensor 68 is used to measure the subject distance which is stored in a memory 72. When the release button 70 is further depressed, a switch 73 turns on to generate a photographing start signal. This photographing start signal is sent via a lens setting mechanism 74 and OR gate 75 to a memory 76. The lens setting mechanism 74 adjusts the focal length of the taking lens 10 by moving it in accordance with the subject distance information stored in the memory 72.

A light from the subject incident on a light detector element 79 via a lens 78 is photoelectrically converted to measure the subject brightness. In response to the photographing start signal, the information on the subject brightness is stored in the memory 76. The stored subject brightness information is sent to an exposure calculation circuit 80 to calculate an exposure value by using the film sensitivity. Upon receiving a lens setting completion signal sent from the lens setting mechanism 74, the shutter control mechanism 15 actuates the shutter 12 (FIG. 1) to program-control it in accordance with the exposure value.

An AE-lock switch 82 is used for storing the subject brightness information in the memory 76 before the release button 70 is actuated. This AE-lock switch 82 is used, for example for the case where, although a principal image is actually located at the position deviated from the frame central area, the exposure control is set to have a brightness of a scene in which the principal image would be present at the central area. Accordingly, if the AE-lock switch 82 has been actuated, there is no practical problem even if a principal image is judged as not present at the central area of a frame.

For photographing a scene with a principal image deviated from the central area, such as a portrait of two persons standing apart from each other, a focus-lock function is used. In photographing with the focus-lock function, a principal image is first observed within a target mark (not shown) at the middle of a finder. Range finding then is carried out while half-depressing the release button 70. Next, while half-depressing the release button 70, the layout is changed by moving the camera and then the scene is photographed by further depressing the release button 70. Whether a principal image is present within the central area of a frame can be known indirectly from whether the focus-lock function has been used.

The release button 70 is depressed at a time during ordinary photographing so that there is only a small time interval from turning on the switch 71 to turning on the switch 73. However, if the focus-lock function is used, it takes time to determine the layout, so that the time interval becomes longer. Therefore, it is possible to determine from this time interval whether the focus-lock function is used. A timer 83 measures the time interval from turning on the switch 71 to turning on the switch 73. If this time period is equal to or larger than a predetermined time period, it is judged that the focus-lock is used, and a signal is sent to the OR gate 84. If the AE-lock is carried out, a signal also is sent from the AE-lock switch 82 to the OR gate 84.

As is apparent from the foregoing description, very often a principal image is not present in the central area of a frame if the focus-lock function or AE-lock function is used during photographing. Therefore, a signal is supplied via the OR gate 84 to the driver 22 to record the central area absence information on the photographic film 18. If the focus-lock function or AE-lock function is not used, no signal is outputted from the OR gate 84 and no information is recorded on the photographic film 18.

Figures 6, 7:
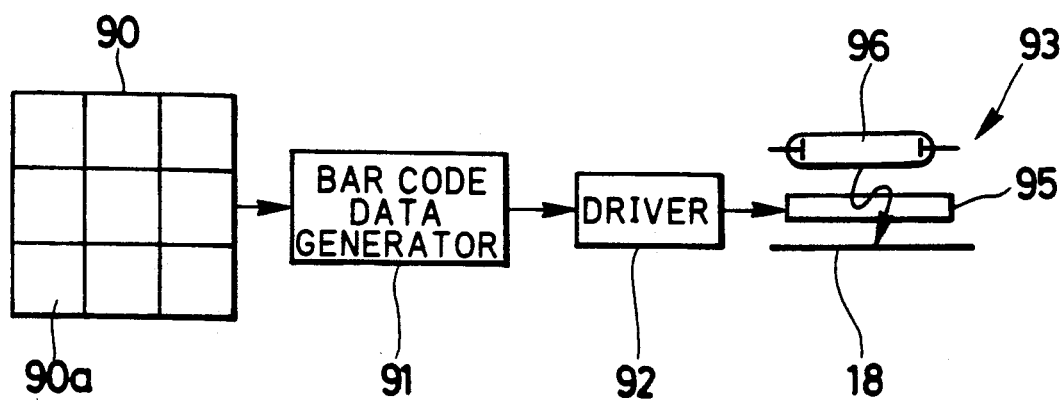
FIG. 6 is a block diagram showing another embodiment of this invention wherein an area where a principal image is located is designated from a touch panel sensor.
FIG. 7 illustrates respective areas designated by the touch panel sensor and characteristic values derived therefrom.

The above embodiments can be realized with a simple mechanism because only the information as to whether a principal image is present at the central area of a frame is recorded on a photographic film. In order to provide exposure control at higher precision, it is preferable to record the information of where a principal image is located. FIG. 6 shows an embodiment wherein a frame is divided into a plurality of areas, and the position information indicating the area where a principal image is located is recorded on a photographic film. A touch panel sensor 90 is mounted on a camera body. The touch panel sensor 90 has, e.g., nine input areas 90a. Each input area 90a corresponds to one of nine divisional frame areas. While observing a subject through a camera finder (not shown), a photographer designates the position of a principal image by touching, with a finger for example, an input area 90a of the touch panel sensor 90 corresponding to the divisional frame area where a principal image is recognized as present. If a principal image is present over a plurality of divisional frame areas, a plurality of input areas 90a are selected correspondingly. In place of the touch panel sensor 90, nine push-button switches may be disposed in a matrix.

In order to confirm a designated area, the selected input area may be illuminated conveniently by a construction in which the touch panel sensor 90 is made transparent and a light emitting panel with a plurality of light emitting diodes disposed in matrix is mounted under the touch panel sensor 90. Lattice lines may be formed on an optical element of a finder in correspondence with divisional frame areas so that a divisional frame area where a principal image is located can be recognized easily while observing a subject through the finder.

The touch panel sensor 90 generates a discrimination signal for a selected input area, and sends it to a bar code data generator 91, which converts the discrimination signal into bar code data and sends that data to a driver 92. The driver 92 drives a bar code recording mechanism in synchronism with a shutter operation to record the bar code on the photographic film 18. In this embodiment, the bar code recording mechanism 93 is constructed of a liquid crystal panel 95 for displaying a bar code, and a flash tube 96. The bar code may be recorded when a frame of the photographic film 18 is fed. In this case, the bar code recording mechanism 93 illuminates and displays only one bar, so that the structure thereof can be simplified.

A bar code reader is mounted along a film passage of a photographic printer to read the bar code recorded on the photographic film 18. The read bar code is decoded, sent to the operation unit, and used for calculating an exposure amount. For example, a scene is discriminated in accordance with the position of a divisional frame area where a principal image is located, and a characteristic value $D_i$ is calculated by using an equation prepared for each type of scene. The following equation (4) is one example of such an equation. Coefficients K0 to K9 are selected in accordance with the type of scene. Characteristic values DU1 to DU3, DM1 to DM3, DL1 to DL3 are an average density of each divisional frame area, as shown in FIG. 7.

$$D_i = K0 + K1 \cdot DU1_i + K2 \cdot DU2_i + K3 \cdot DU3_i + K4 \cdot DM1_i + K5 \cdot DM2_i + K6 \cdot DM3_i + K7 \cdot DL1_i + K8 \cdot DL2_i + K9 \cdot DL3_i \quad (4)$$

The coefficients K0 to K9 of equation (4) are determined previously in accordance with scene type. For the divisional frame area where a principal image is present, the value of the coefficients are made large so as to weight such a frame area greatly. The obtained characteristic value $D_i$ is substituted into equation (3) to calculate a printing exposure amount.

In discriminating an input area, an input area number, a code of a combination of an input area row number and column number or the like may be used. Instead of the bar code, numerals, characters, marks or the like may be used. A handwritten character input panel may be mounted on the camera body and a liquid crystal panel or light emitting panel may be disposed at the back of a photographic film. In this case, handwritten characters, numerals, symbols, coordinate points or the like representative of the position of a principal image are recorded on a photographic film by using the liquid crystal panel or light emitting panel.

Figure 8:
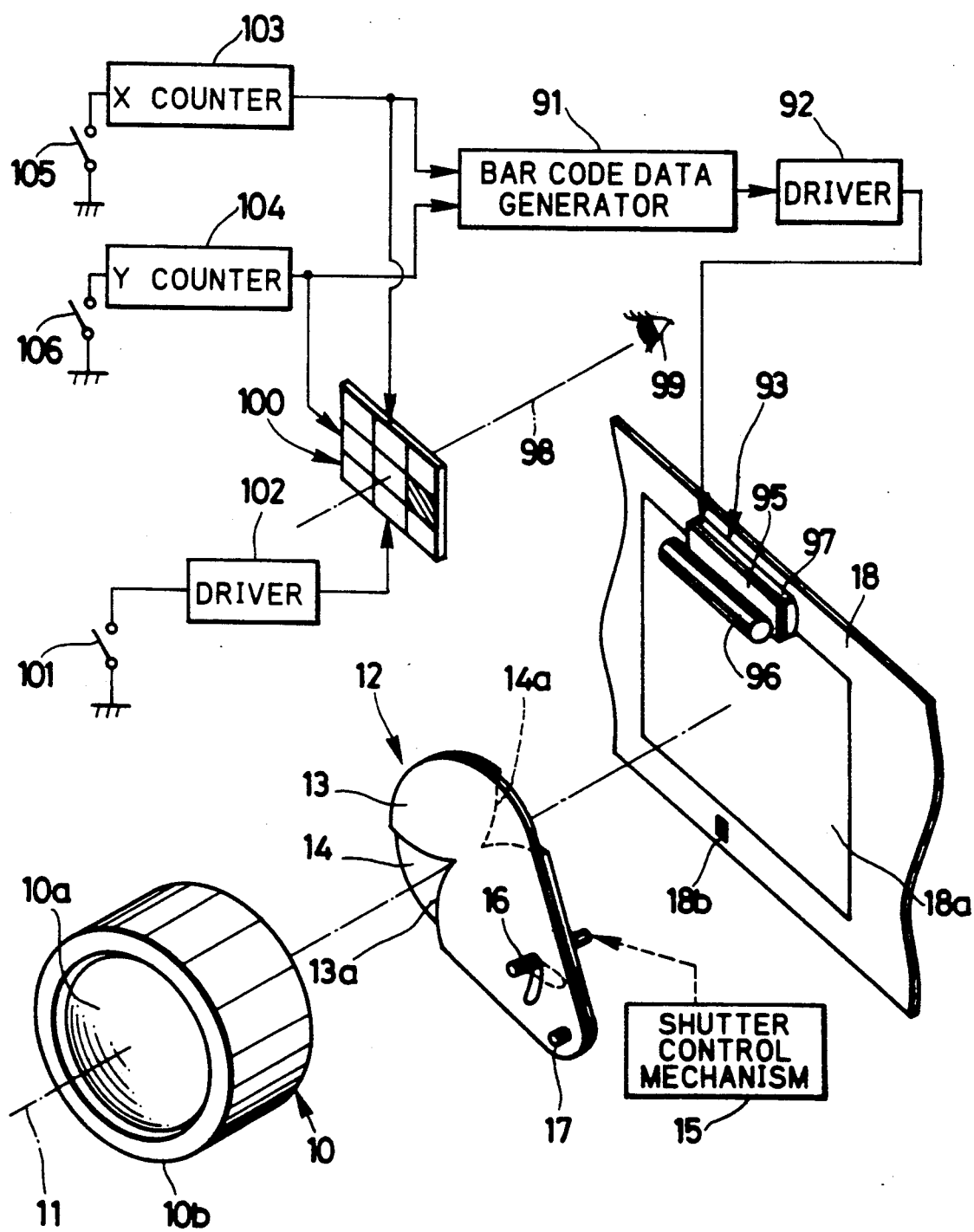
FIG. 8 is a schematic diagram showing still another embodiment of this invention wherein a liquid crystal panel is mounted within a finder for visual recognition of an area where a principal image is located.

FIG. 8 shows an embodiment wherein an area confirmation display panel is mounted within a finder. Elements similar to those shown in FIG. 1 are represented by using identical reference numerals. An electro-optical display element, such as a liquid crystal panel 100 disposed along a finder optical axis 98 has a plurality of, e.g., nine display segments, each being transparent in an ordinary case. When a switch 101 is turned on, the liquid crystal panel 100 is driven by a driver 102 to intercept light into a desired display segment. An X-counter 103 and a Y-counter 104 are provided to designate a desired display segment. These counters 103, 104 count the number of actuations of an X-direction switch 105 and a Y-direction switch 106, both provided on the outside of the camera.

While observing a subject with an eye 99 at the finder, the X- and Y-direction switches 105 and 106 are manipulated to designate the display segment where a principal subject is present. For example, if a principal subject is present at the second row and first column position, the X-direction switch 105 is turned on once, and the Y-direction switch 106 is turned on twice. With this operation, the display segment at the second row and first column is put in a light intercepted state, as shown by the hatched lines in FIG. 8. Accordingly, it becomes possible to confirm whether the position of a principal object has been correctly designated.

The counts of the counters 103 and 104 are sent to a bar code data generator 91 and are converted into bar code data representative of the position of a display segment where a principal image is located. This bar code data is sent via a driver 92 to a bar code recording mechanism 93 to record the bar code on a photographic film 18. Reference numeral 97 represents a lens.

Nine divisional frame areas are designated by the display elements. This number may be increased greatly (e.g., to be several hundred), and each area may be designated by X-Y coordinate values to record numerals or codes representative of the coordinate values on a photographic film. A mark may be recorded by using a light emitting diode or the like at the peripheral area outside a frame of a photographic film corresponding in position to a line position extending from a principal image within the frame.

While the above embodiments use density correction, the invention is also applicable to color correction. Furthermore, information of the position of a principal image may be used in determining a fundamental exposure amount.

Range finding of an automatic focussing camera is performed by first placing a principal subject on the target mark at the middle of a finder, and then half-depressing the release button to actuate the automatic focussing mechanism. The position of a principal subject moved from the center of a frame can be known in the following manner. A line sensor is disposed along a central lateral line of an area equivalent to a frame. A portion of a subject is measured at the time of range finding, and compared with a value measured immediately before photographing upon a full depression of the release button. FIGS. 9 to 12B show such an embodiment. Elements similar to those shown in FIG. 5 are represented by using identical reference numerals.

Figure 11A:
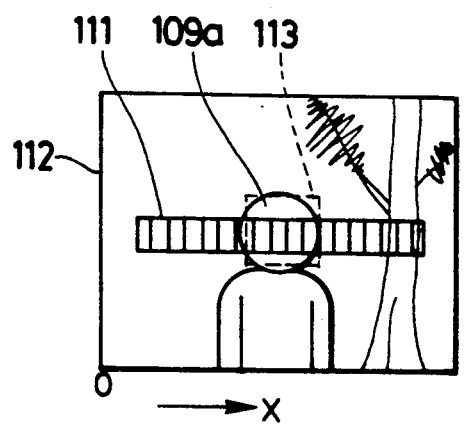
FIG. 11A illustrates the relationship between a view finder field during range finding and the line sensor.

In order to detect an image of a principal subject 109a within a frame, a lens 110 and line sensor 111 are mounted at the front of the camera body. The lens 110 and line sensor 111 picks up a lateral area substantially at the center of the frame. Although the line sensor 111 is not disposed within the finder, the line sensor 111 is depicted in FIG. 11A, in order to readily understand the relationship between the line sensor 111 and the finder view field 112. In FIG. 11A, a target mark 113 is displayed within the finder, the area within the target mark 113 being a range finding area. The distance of a principal subject within the target area is measured with the range finding device.

A time sequential signal outputted from the line sensor 111 is amplified by an amplifier 114 and is sent to a memory 115 and comparator 116. The memory 115 stores the time sequential signal when a release button 70 is half-depressed and a switch 71 turns on. The comparator 116 compares the time sequential signal read from the memory 115 with a time sequential signal outputted in real time from the line sensor 111 when the release button 70 is full-depressed and a switch 73 turns on. In accordance with the comparison results, the amount of movement of the principal image from the center of the line sensor 111 is detected.

Figure 10:
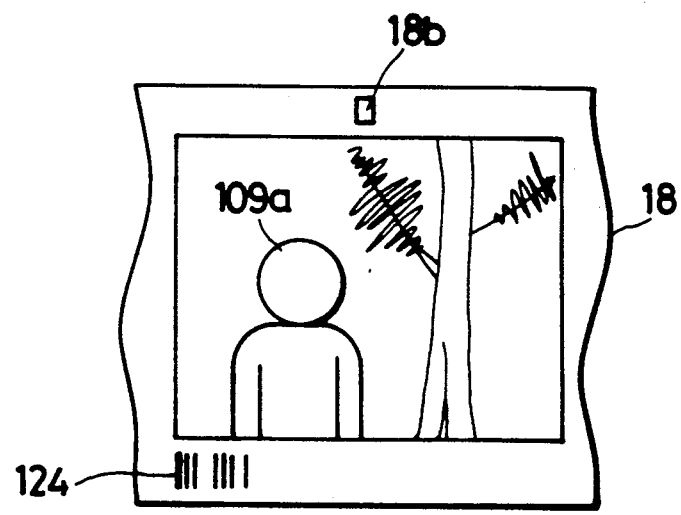
FIG. 10 illustrates a photographic film with an image frame photographed with the photographic camera shown in FIG. 9.

A position determining unit 117 determines the position of the principal subject in accordance with the motion amount detected by the comparator 116, the magnification ratio between the taking lens 10 and lens 110, and the position of the range finding area. The determined position information is sent to a bar code generator 118. The bar code data outputted from the bar code generator 118 is sent to a bar code recording mechanism 120. In this embodiment, the bar code recording mechanism 120 is constructed of a liquid crystal display 121 for displaying a bar code, a lamp 122 for illuminating the liquid crystal display, and a driver 123 for making the lamp 122 illuminate in synchronization with operation of the shutter 12. The bar code recording mechanism 120 records the bar code 124 representative of the position of the principal image 109a on a photographic film 18, as shown in FIG. 10.

Figure 9:
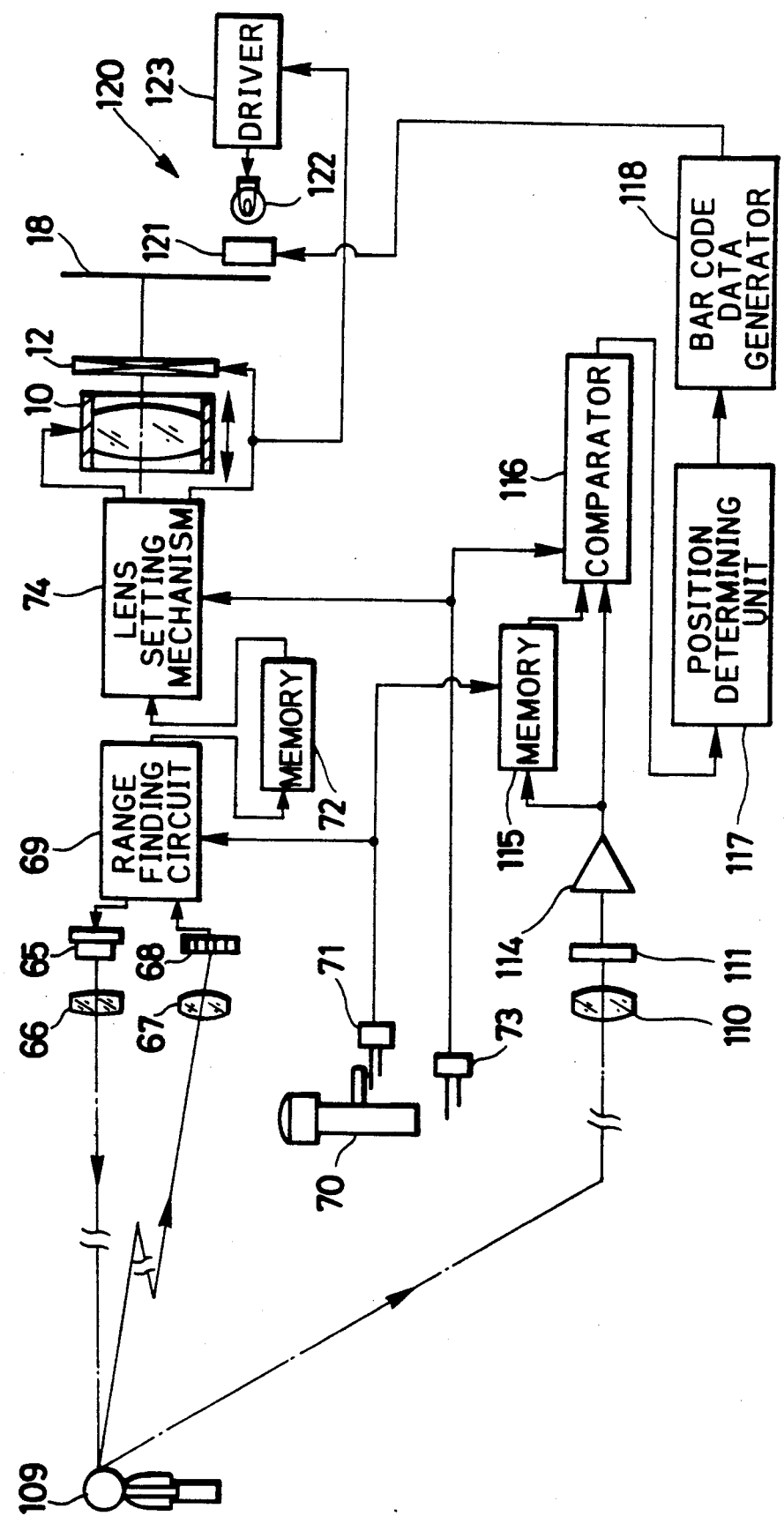
FIG. 9 is a block diagram of a photographic camera of this invention wherein two types of time sequential signals outputted from a line sensor during range finding and photographing are compared with each other to detect the position of a principal image.
Figure 11B:
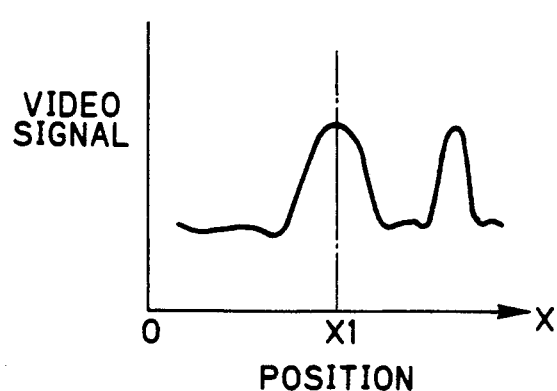
FIG. 11B shows a waveform of a time sequential signal outputted from the line sensor.

Next, the operation of the apparatus shown in FIG. 9 will be described. In photographing a scene, as shown in FIG. 11A, while observing a principal subject 109 through the finder, the camera is pointed so as to locate the principal subject 109 within the target mark 113. Next, as the release button 70 is half-depressed and the switch 71 is turned on, the distance to the principal subject 109 is measured as described previously, and the obtained distance information is stored in the memory 74. In the meantime, the line sensor 111 picks up the subject at the lateral area partly inclusive of the range finding area enclosed by the target mark 113. As the switch 71 turns on, the time sequential signal outputted from the line sensor 26 as shown in FIG. 11B is stored in the memory 115.

Figure 12A:
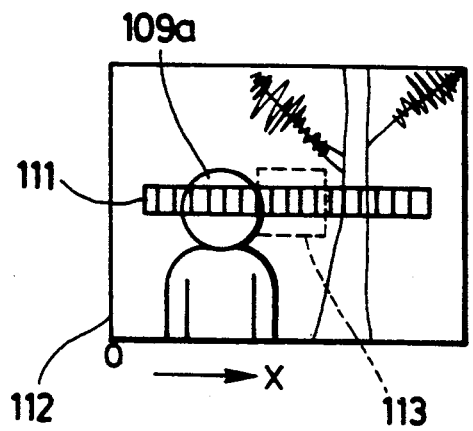
FIG. 12A illustrates the relationship between a view finder field during photographing and the line sensor.
Figure 12B:
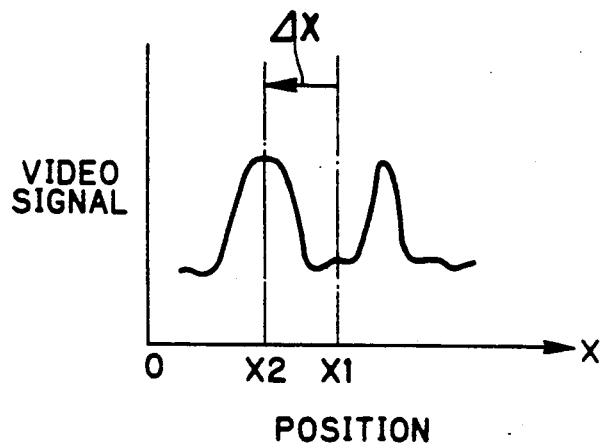
FIG. 12B shows a waveform of a time sequential signal outputted from the line sensor.

If a photographer desires a layout with the principal subject 109 shifted to one side of a frame, the camera is moved, while the switch 71 is turned on and the focus-lock state is maintained, to shift the principal subject 109 to one side of the frame as shown in FIG. 12A. Next, as the release button 70 is fully-depressed and the switch 73 turns on, the lens setting mechanism 74 adjusts the focal length of the taking lens 10, and immediately thereafter, the shutter 12 is operated to take the subject on the photographic film 18.

In the meantime, as the switch 73 turns on, the comparator 116 operates to compare the time sequential signal (FIG. 12B) outputted from the line sensor 111 with the time sequential signal (FIG. 11B) read out from the memory 115 to calculate the shift amount $\Delta X$ between the two signal waveforms. Taking the position of the range finding area on the frame as X1 and the coefficient as K, the position X2 of the principal subject 109 after its movement is obtained by:

$$X2 = X1 + K \cdot \Delta X$$

The coefficient K is a ratio between the motion amount of an image within the finder view field and that of the image on the scene frame. This ratio can be represented by a ratio between the focal length of the taking lens 10 and that of the lens 110.

In this embodiment, the left end of the frame is used as the origin of the X coordinate. If the center of the frame is used as the origin, the position of a principal image is recorded using the motion amount ($K \cdot \Delta X$). The position X2 of the principal subject 109 on a frame obtained by the position determining unit 117 is converted into bar code data and is sent to the bar code recording mechanism 120 to be recorded on the photographic film 18.

In taking a scene having a layout with the principal subject 109 located at the center of a frame, the direction of the camera is unchanged from that at the time of range finding, and the release button 70 is fully-depressed at a time. In this case, the time sequential signal at the time of range finding and that at the time of photographing (including slightly before and after photographing) have the same phase so that the shift amount $\Delta X$ is zero and the bar code representative of the position X1 is recorded on the photographic film 18.

In the case of recording the position information of a single point of a principal image as described above, an area having a certain size around the position is considered the principal image and the image characteristic value is derived from such an area. The area of the principal image may be defined in accordance with the type of a principal image or by deriving pixels having a color similar to the point designated by the position information with reference to its color density. With such an arrangement, exposure control for a photographic printer can be executed with high precision.

Figure 13:
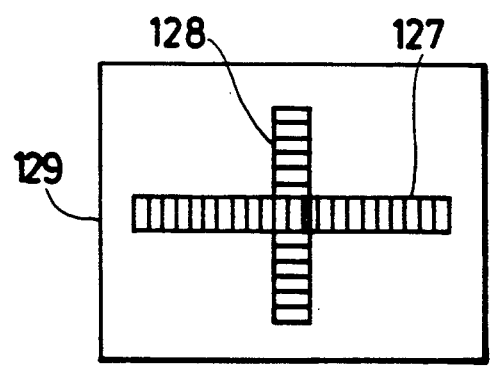
FIG. 13 illustrates an embodiment using two line sensors.
Figure 14:
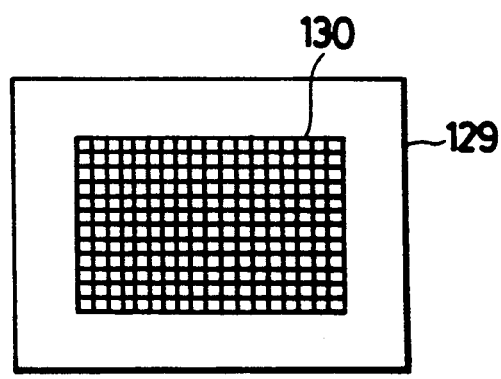
FIG. 14 illustrates an embodiment using an area sensor.

In the above embodiment, the motion in the lateral direction of a scene frame is detected. If the motion amount in the vertical (Y) direction of the scene frame is to be checked, two line sensors 127 and 128 intersecting orthogonally at the center of the finder view field 129 as shown in FIG. 13, may be used. An area sensor 130 may be used instead, as shown in FIG. 14.

Figure 15:
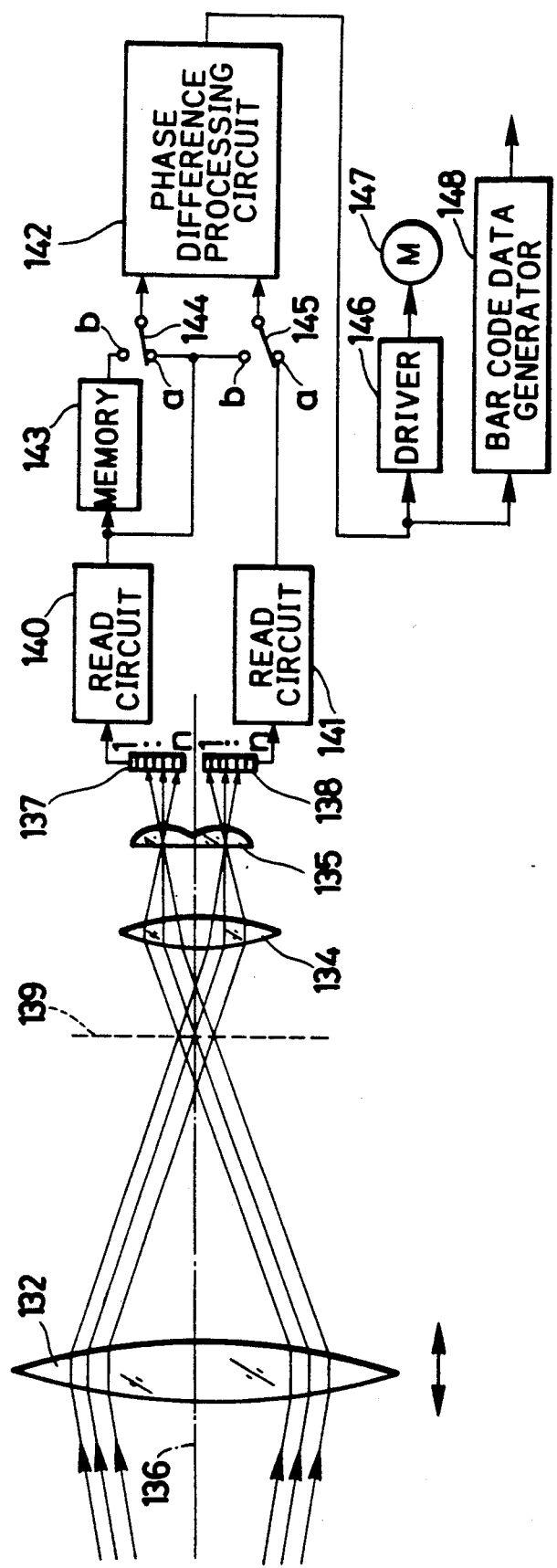
FIG. 15 is a schematic diagram of this invention wherein the position of a principal image which has moved after range finding is detected by using an AF mechanism of the phase difference detection method.

A recent AF mechanism of a single-lens reflex camera mainly uses the phase difference detecting method. FIG. 15 shows an embodiment wherein the position of a principal subject after movement is detected by using the AF mechanism of the phase difference detecting method. A condenser lens 134 and separator lens 135 are mounted at the back of a taking lens 132. At the back of the separator lens 135, two line sensors 137 and 138 also are mounted symmetrical to the optical axis 136 of the taking lens 132. Each of these line sensors 137 and 138 has n pixels.

A plane 139 equivalent to the photographic film is positioned between the taking lens 132 and condenser lens 134. Therefore, actually a half mirror (not shown) is mounted in front of the film-equivalent plane 139, the half mirror being arranged to be lifted up. In addition, a sub mirror (not shown) is mounted at the back of the half mirror. Accordingly, light transmitted through the half mirror is reflected at the sub mirror and directed toward the bottom of the camera body. The condenser lens 134, separator lens 135 and line sensors 137 and 138 are mounted accordingly on the bottom of the camera body.

A pair of subject images are incident on the line sensors, and are converted photoelectrically into electrical signals at respective pixels. The electrical signals generated at the line sensors 137 and 138 are read by read circuits 140 and 141 and are sent to a phase difference processing circuit 142. In order to detect the position of a principal subject after its movement by using the focus-lock function, a memory 143, and switches 144 and 145 are provided.

The images on the line sensors 137 and 138 come near the optical axis if the subject image is in a front focus state, i.e., focussed at the position in front of the film-equivalent plane 139. Conversely, the images go far from the optical axis 136 if the subject image is in a rear focus state. The images take a predetermined position midway between the rear and front focus states, if they are in the focussed state. Accordingly, the focussed state can be discriminated by the phase difference processing circuit 142 by detecting the positions of the images relative to the optical axis 136 in accordance with the electrical signals read from the line sensors 137 and 138.

The phase difference detecting method is used in detecting the relative position of the images on the line sensors 137 and 138. According to this method, the focussed state is discriminated by obtaining a correlation value of a pair of images on the line sensors 137 and 138 by the following equation (5) and referring to the relative motion amount (phase difference) corresponding to a maximum (or minimum) correlation value.

$$H(L) = \sum_{K=1}^{n} |B(K) - R(K - L - 1)| \quad (5)$$

where L is an integer variable corresponding to the relative motion amount which takes a value from "1" to "n". B(K) represents a time sequential signal outputted from the line sensor 137, and R (K=L−1) represents a time sequential signal outputted from the line sensor 138.

Figure 16A:
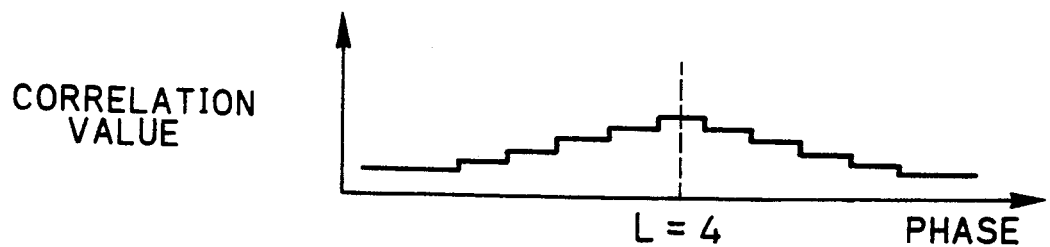
FIG. 16A shows a waveform of an in-focus state.

For example assuming the number n of pixels is "9", the calculation using the equation (5) is carried out each time the motion amount L changes from "1" to "9" so that the correlation values H(1), H(2), H(3) . . . , H(9) are obtained. As shown in FIG. 16A, it is assumed that the taking lens 132 is in the focussed state if the correlation value H(4) becomes a maximum when the motion amount L is "4". In the example shown in FIG. 16B. the correlation value H(2) becomes maximum at L=2. Since it is smaller than L=4. the taking lens 13 is in a front focus state, and the offset value of focus corresponds to "2" by the pixel number. In the example shown in FIG. 16C. since the correlation value H(6) becomes maximum, the taking lens is in a rear focus state, and the offset value of focus corresponds to "2" by the pixel number.

Referring again to FIG. 15, the switches 144 and 145 are in contact with the contacts a in an ordinary case. While the camera is pointed to a principal subject and when the release button is touched with a finder, a touch sensor (not shown) turns on. As a result, the phase difference processing circuit 142 is actuated to compare the two time sequential signals read from the line sensors 137 and 138, thereby obtaining a relative motion amount L which takes a maximum correlation value. If this relative motion amount L is different from the relative motion amount in the focussed state, it is judged from the shift direction, as described before, if the taking lens is in a rear or front focus state. A motor 147 is rotated by a driver 146 in the direction suitable for the shift direction so as to move the taking lens 132 along the optical axis 136. As the taking lens 132 is moved, the subject images incident on the line sensors 137 and 138 also move. However since the phase difference processing circuit 142 operates periodically, the relative motion amount can be detected even while the taking lens 132 is moved. When the relative motion amount L taking a maximum correlation value becomes equal to the relative motion amount in the focussed state, the motor 147 stops its rotation.

Figure 16B:
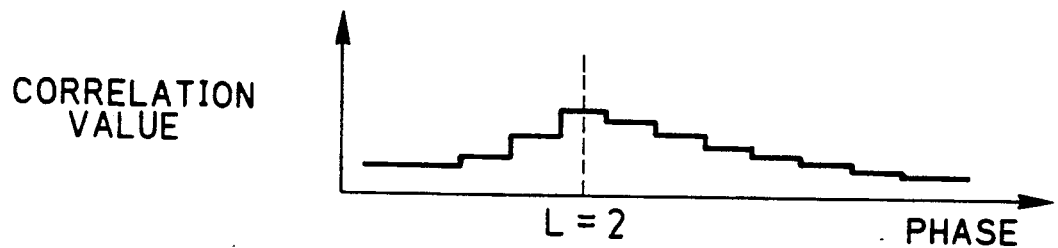
FIG. 16B shows a waveform in a front focus state.
Figure 16C:
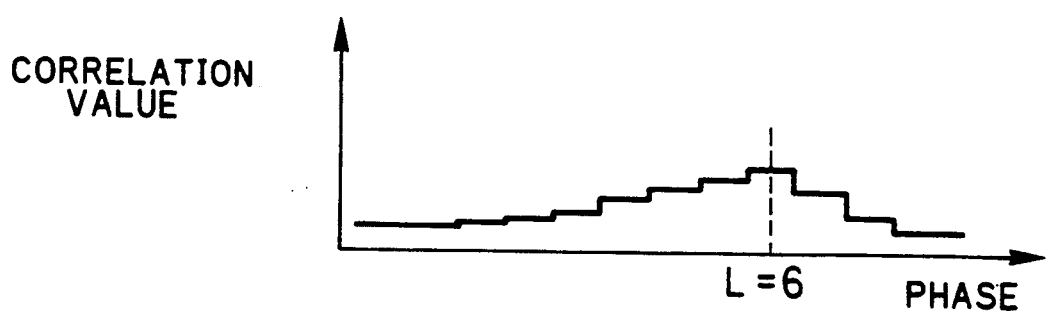
FIG. 16C shows a waveform in a rear focus state.

If the release button is fully-depressed at a time, the shutter is operated to photograph a scene. If a focus-lock is to be carried out, the release button is half-depressed, as discussed before, and the operation of the driver 146 is terminated, so that the position of the taking lens 132 is unchanged. Upon half depression of the release button, the time sequential signal outputted from the line sensor 137 is stored in the memory 143. After changing the direction of the camera under the focus-lock state to define a layout, the release button is fully-depressed. Upon full depression of the release button, the shutter is operated to start photographing a scene as described previously. At the same time, the switches 144 and 145 are made to contact the contacts and the phase difference processing circuit 142 compares the time sequential signal read from the memory 143 with the time sequential signal read in real time from the line sensor 137 to calculate the correlation value for respective relative motion amounts L. For instance, if the waveform of correlation values is as shown in FIG. 16B. it can be known that the principal subject moved to the left from the center of a frame by an amount corresponding to two pixels. This shift amount is sent to the bar code data generator 148 and is converted into a bar code data which is recorded on the photographic film, as described previously.

Figure 17:
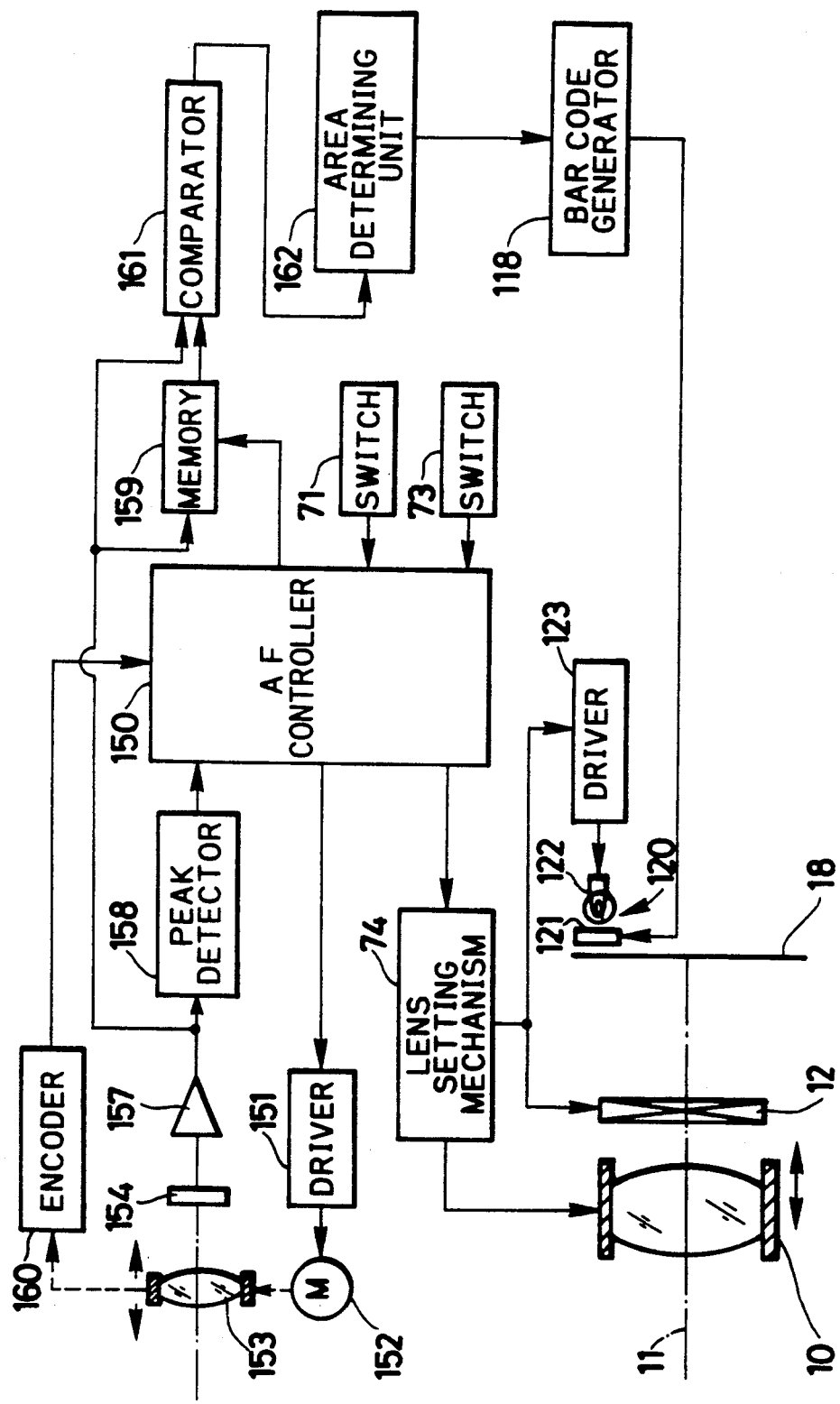
FIG. 17 is a block diagram showing another embodiment of this invention wherein an area to which a principal image has moved after range finding is detected by using an AF mechanism of the contrast detection method.
Figure 18:
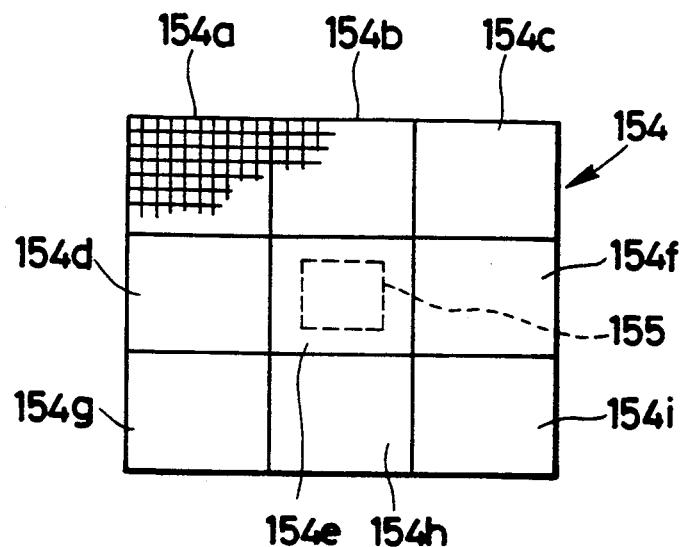
FIG. 18 illustrates the area sensor used with the embodiment shown in FIG. 17.

FIG. 17 shows an embodiment wherein a single area sensor is used for finding the range and detecting the distance, respectively of a principal subject. Elements similar to those shown in FIG. 9 are represented by using identical reference numerals. When a release button 70 is half-depressed and a switch 71 is turned on, an AF controller 150 causes a driver 151 to rotate a motor 152. The motor 152 moves a lens 153 reciprocally once to perform a focal point adjustment for an area sensor 154. The area sensor 154 is divided into nine areas 154a to 154i, as shown in FIG. 18. The central area 154e is used for range finding. Reference numeral 155 represents a target mark.

The time sequential signal outputted from the area sensor 154 is amplified by an amplifier 157 and is sent to a peak detector 158 and memory 159. The peak detector 158 adds together outputs from pixels within the area 154e to obtain a maximum (peak) addition value. That is, if the lens 153 is in the focussed state relative to a principal subject positioned within the target mark 155, the addition value of the area 154e becomes a peak value.

When the peak detector 158 detects a peak value, a peak detection signal is sent to an AF controller 150. In the meantime, the position of the lens 153 is measured with an encoder 160, and the measured position signal is inputted to the AF controller 150. The AF controller 150 stores the position signal as a focussed position signal when the peak detection signal is outputted. The AF controller 150 causes a memory 159 to be set to a write mode, and writes the time sequential signal for the area 154e therein.

While the release button is half-depressed and the focus-lock state is maintained, the direction of the camera is changed to determine the layout of a scene. After the determination of the layout, the release button is fully-depressed to photograph the scene. When the switch 18 turns on, the AF controller 150 causes the lens setting mechanism 74 to move the taking lens 10 along its optical axis 11 to thereby set the taking lens at the position corresponding to the focussed position signal.

When the switch 73 turns on, the comparator 161 sequentially compares the time sequential signal for the area 154e stored int eh memory 159 with the time sequential signals read from respective areas. Specifically, time sequential signals are added for each area and the added value is compared with the added value of the time sequential signal stored in the memory 159. An area determining unit 162 finds an area having a largest similarity of the added values in accordance with the output signals from the comparator 161. The position information representative of the determined area is supplied to a bar code data generator 118, which converts it into bar code data. The bar code data is recorded on a photographic film 18 by a bar code recording mechanism 120.

Figure 19:
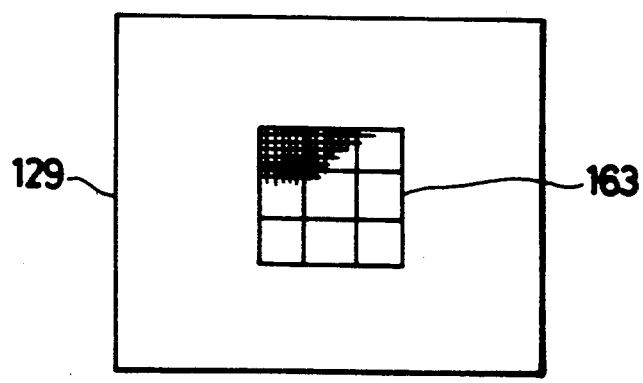
FIG. 19 illustrates another embodiment of an area sensor.

In this embodiment, an image area sensor is used, but a photosensor having a plurality of light receiving surfaces, such as CdS, may be used instead. The area sensor 154 picks up almost the whole image within the finder view field. As shown in FIG. 19, an area sensor 163 which takes only the generally central area within the finder view field 129 may also be used instead.

The quality of finished photoprints may be improved further by using, together with the position information of a principal image, the type of illumination light, illumination conditions (front light, rear light), the presence/absence of flash photographing, the intensity ratio of three component colors of illumination, the selection of grey color or white color, the type of principal image (person, animal, flower and the like) and the like respectively recorded on a photographic film. Further, instead of recording the position information on a photographic film, it may be recorded on an IC card, a magnetic recording member formed at the outer periphery of a patrone, and the like. Furthermore, it may be recorded on a recording medium coupled to a photographic film.

The present invention may be applied to photoprints of images recorded with an electronic still camera. The electronic still camera uses a magnetic floppy to record thereon not only the image data but position information. For instance, in displaying an image on a CRT and recording it on a color paper in a digital color printer, the position information is read and used to control of an exposure amount at each pixel point in accordance with the image data.

In the above embodiments, the focus-lock function is used to judge whether a principal image is present at the central area of a frame. It is convenient that there is provided a principal image position detecting unit for detecting the position of the principal image within a frame which has image subjected to range finding in association with the automatic focussing mechanism, and that the coordinate values of a principal image within a frame, a code of a divisional frame area, or the like is recorded on a photographic film.

As described previously, it is possible to obtain photoprints with an excellent image quality if the position information is recorded at the time of photographing, a principal image is identified on the basis of the position information, and the exposure amount is determined so as to emphasize the principal image. Considerable improvement is possible by combining this photograph printing system and a color photographic film (referred to hereinafter as "silver halide color photosensitive material", a term mainly used in the field of photographic chemistry) having at least one donor layer having a specific weight-averaged wavelength of spectral sensitivity and providing an interlayer effect. Specifically, such a silver halide color photosensitive material has the advantage of improved fidelity of color reproduction and saturation. This advantage is conspicuous for the case a color paper is given a sufficiently large exposure amount to obtain a finished photoprint having a dignified and pleasant appearance of a rather high color density.

A silver halide photosensitive material having a donor layer with a specific interlayer effect, however, is associated with a problem of a tonal reproduction much lower than a silver halide color photosensitive material without such a donor layer. Specifically, the former has poor color gradation, linearity and poor color gradation balance of respective silver halide emulsion layers. Accordingly, the balance between printing exposure amounts is likely to change relative to respective densities of an image recorded on the former photosensitive material. The latitude of a printing exposure amount used for printing an image on a color paper is narrow particularly for the area from the toe part to halftone or shadow part on a characteristic curve of this photosensitive material. The allowable gradation is quite narrow, particularly for a high printing density.

It has been found statistically that a photographer feels much more unsatisfied for photoprints having a high density in excess of an allowable range than for photoprints having too low a density. With the silver halide color photosensitive material of this invention, a photographer is likely to feel unsatisfied for photoprints having a high density because the allowable gradation for high density photoprints is particularly narrow. Such a problem can be solved by making a color correction so as to emphasize a principal image in accordance with the position information of the principal image. In other words, while providing the characteristic features of the silver halide color photosensitive material of this invention, i.e., the improvement on the fidelity of color reproduction and saturation, the problem associated with the tonal reproduction can be solved.

Even a skilled operator who determines the printing conditions visually, the quality of finished photoprints might vary. With a conventional apparatus automatically determining an exposure amount, the printing conditions are determined statistically, irrespective of a particular principal image intentionally designated by a photographer, resulting in a low manufacturing yield in the printing process.

According to the present invention, the position information on the position or area of a principal image is recorded on a recording medium, and the position information is used to identify the principal image during the printing process to perform a color correction as emphasizing the principal image, thereby improving the productivity of photoprints by utilizing the advantages of color reproduction of the silver halide color photosensitive material of this invention having a donor layer with a specific weight-averaged wavelength of spectral sensitivity and an interlayer effect.

Silver Halide Color Photosensitive Materials

A silver halide color photosensitive material is illustrated hereinbelow. A color photosensitive material of the present invention is comprised by a support having thereon at least one blue-sensitive silver halide emulsion layer (BL), at least one green-sensitive silver halide emulsion layer (GL), and at least one red-sensitive silver halide emulsion layer (RL), and optionally coloring layers or protection layers such as other intermediate layer, filter layer or antihalation layer (AH). Each silver halide emulsion layer contains yellow dye-forming coupler, magenta dye-forming coupler or cyan dye-forming coupler hereinbelow illustrated. The wavelengths of spectral sensitivity thereof are, each independently, 400~520 nm for BL, 480~600 nm for GL and 580~680 nm for RL, preferably 580~640 nm range for RL of visible wavelength. The weight-averaged wavelengths of spectral sensitivity peak are preferably in the range of from 400~480 nm for BL, 530~575 nm for GL and 580~655 nm for RL.

Each silver halide emulsion layer also can be placed at any layer construction by dividing a plurality of photosensitive layers consisting of substantially equal level of spectral sensitivity distribution and substantially equal level of coloring color coupler with different sensitivities in order to ensure covering exposure scale, for example low-sensitive red-sensitive layer (RL-n), intermediate-sensitive red-sensitive layer (RL-m) and high-sensitive red-sensitive layer (RL-o).

A specific feature of color photosensitive material of the present invention consists in having at least one layer of the donor layer (hereinafter designated as FL) which exerts an interlayer effect having a weighted-average wavelength with the difference being greater than 5 nm, preferably 10 nm, from a peak wavelength of spectral sensitivity peak of RL. GL or BL. The weight-averaged wavelength ($\lambda$) is defined for example by the following equation:

$$\overline{\lambda} = \frac{\int_{400}^{680} \lambda \cdot S(\lambda) d\lambda}{\int_{400}^{680} S(\lambda) d\lambda}$$

wherein $S(\lambda)$ is the spectral sensitivity distribution at wavelength $\lambda$. For details, please refer to the definition in U.S. Pat. No. 4,663,271 and Japanese Patent Laid-open Publication No. 63-89580.

A spectral sensitivity distribution and peak wavelength of spectral sensitivity can be measured by an equi-energy spectral sensitometer (or a spectral sensitometer which can modify wave-distribution of light source to equi-energy).

If the weight-averaged wavelength of FL (hereinafter designated as $\lambda F$) differs from spectral sensitivity peak of each silver halide emulsion layer, it is preferable as follows:

(1) $\lambda F$ is at shorter wave side than spectral sensitivity peak wavelength of GL;
(2) $\lambda F$ is at longer wave side than spectral sensitivity peak wavelength of RL; or
(3) $\lambda F$ is at shorter wave side than spectral sensitivity peak wavelength of BL.

It is preferable to exert an interlayer effect to RL in the case (1), to GL or BL in the case (2), and to GL in the case (3). A preciseness or saturation of color reproducibility of spectrum on complex colors for blue, green or violet colors in the case (1), for red, yellow or brown colors in the case (2), and for blue or skyblue colors in the case (3), can be improved. The sharpness and color reproduction of the final image can be improved by means of a color contrast effect, as illustrated in Japanese Patent Appln. No. 1-96611.

$\lambda F$ in case (1) preferably is located in the range of 460~535 nm, preferably 490~530 nm. In case (2), $\lambda F$ preferably is located in the range of 620~680 nm, preferably 640~680 nm. In case (3), $\lambda F$ preferably is located in the range of 400~460 nm, preferably 400~430 nm. An advantageous effect can be reproduced in the case (1).

FL in the case (1) can be combined with the others, and also can be constructed in one or more layers.

FL contains silver halide emulsion and DIR-coupler and is placed, in order to exert selectively an interlayer effect to any of BL. GL or RL. with coupler which provides a similar coloring to another layer having different hue of a corresponding silver halide emulsion layer substantially exerting an interlayer effect. The interlayer effect also can be made selectively by arrangement of layers. In color reversal photosensitive materials, using a non-coloring DIR-compound and applying a system which exert an interlayer effect at the first developing process are preferable. Details are described in Japanese Patent Appln. No. 1-93957.

FL of the present invention contains DIR-compound. Examples of DIR-compound include DIR-coupler, DIR-redox compound releasing coupler. DIR coupler-releasing coupler, DIR coupler-releasing redox compound, and DIR-redox releasing redox compound, described in Japanese Patent Laid-open Publication Nos. 62-160448, 63-89580, 60-185950 and 62-24252. In the present invention, a compound which can exert an interlayer effect and an edge effect is preferable. Examples are DIR-coupler of the formula (I) or exemplified DIR-compound as described in Japanese Patent Laid-open Publication No. 1-40793.

Examples of sensitizing dyes used in FL include cyanine dyes, merocyanine dyes, rhodacyanine dyes or hemicyanine dyes. Adjustment of spectral sensitivity distribution can be made by selecting sensitizing dyes, a combination thereof, combining with mercaptoheterocyclic compound, adding supersensitizing dyes, or by means of filter-effect of dyes or color layer.

FL selectively exerts an interlayer effect on the specific photosensitive layer. For that purpose, it is preferable to combine the means including a selection of DIR-compounds, layer arrangement of FL, decreasing means for interlayer effect on a specific layer or a selection of silver halide grain size.

The coloring layers of the present invention may include a dispersed material which is mordanting colloidal silver and water-soluble dyes in cationic polymer or cationic polymer latex and a solid fine particle dispersion of substantially water-insoluble dyes such as fine crystalline particle dispersion of the said dyes or micell dispersion of the said dyes, and in a reverse side of a support, dyes or pigments are dispersed in a binder which is removed or dissolved during the developing process. For example, it is preferable to use the dye composition, dyes represented by the formula (II) to (VI) or mordant of the formula (I) illustrated in Japanese Patent Appln. No. 63-255425.

A silver halide photosensitive material of the present invention is preferably of light sensitivity over ISO-25, more preferably over ISO-100, most preferably ISO-200~1600 and is monochrome photosensitive material, reversal color photosensitive material, preferably color negative photosensitive material.

A photosensitive material of the present invention is set on the support and is constructed of at least one layer of blue-sensitive silver halide emulsion layer, green-sensitive silver halide emulsion layer or red-sensitive silver halide emulsion layer. There is no limitation on the number and order of layers of silver halide emulsion layers and non-photosensitive layers. A typical example thereof is a silver halide photosensitive material having at least one photosensitive layer comprising a plurality of silver halide emulsion layers, which are substantially equal in color sensitivity but different in photosensitivity, the said photosensitive layer being a unit photosensitive layer having color sensitivity to any of blue-, green- and red-light, and in a multi-layer silver halide photosensitive material, an arrangement of unit photosensitive layer, in general, being set in the order of red-sensitive layer, green-sensitive layer and blue-sensitive layer from the support. The order thereof can be reversed, and a setting order, in which a different photosensitive layer is inserted in the equal color sensitive layers, can also be set up.

Non-photosensitive intermediate layers also can be set between silver halide photosensitive layers and uppermost and lowest layers thereof.

Couplers and DIR-compounds as described in Japanese Patent Laid-open Publication Nos. 61-43748, 59-113438, 59-113440, 61-20037 or 61-20038 can be incorporated in the said intermediate layers, and general color mixture inhibitor can also be incorporated therein.

The plurality of silver halide emulsion layers constituting each unit photosensitive layer preferably can be comprised with double layer construction of high-sensitive emulsion layer and low-sensitive emulsion layer as described in German Patent No. 1,121,470 and British Patent No. 923,045. It is preferable to arrange the layers in order of decreasing photosensitivity toward the support. Non-photosensitive layers also can be set up between the silver halide emulsion layers. The less-sensitive emulsion layer can also be set distant from the support and the high-sensitive emulsion layer close to the support, as described in Japanese Patent Laid-open Publication Nos. 57-112751, 62-200350, 62-206541 and 62-206543.

For example, the layers can be set, at most distant from the support, in the order of low-sensitive blue-sensitive layer (BL)/high-sensitive blue-sensitive (BH)/high-sensitive green-sensitive layer (GH)/low-sensitive green-sensitive layer (GL)/high-sensitive red-sensitive layer (RH)/low-sensitive red-sensitive layer (RL), or in the order of BH/BL/GL/GH/RH/RL, or in the order of BH/BL/GH/GL/RL/RH.

The layers also can be set, at most distant from the support, in the order of blue-sensitive layer/GH/RH/GL/RL, as described in Japanese Patent Examined Publication No. 55-34932. Further, the layers also can be set, at most distant from the support, in the order of blue-sensitive layer/GL/RL/GH/RH, as described in Japanese Patent Laid-open Publication Nos. 56-25738 and 62-63936.

Also as described in Japanese Patent Examined Publication No. 49-15495, an arrangement consisting of three different photo-sensitive layers in order of lower photosensitivity toward the support, in which the upper layer is the most photosensitive silver halide emulsion layer, the intermediate layer is a less photosensitive silver halide emulsion layer than the upper, and the lower layer is a still less photosensitive silver halide emulsion layer than the intermediate. These different photosensitivities of three layers can also be set in the arrangement, in the order of distant side from the support, the intermediate-sensitive emulsion layer/high-sensitive emulsion layer/low-sensitive emulsion layer within equal color sensitive layer as described in Japanese Patent Laid-open Publication No. 59-202464.

Various arrangement, for example, in the order of high-sensitive emulsion layer/low-sensitive emulsion layer/intermediate-sensitive emulsion layer, or low-sensitive emulsion layer/intermediate-sensitive emulsion layer/high-sensitive emulsion layer can be set up.

Over four layers can also be arranged in various orders.

FL of the present invention optionally can be set up.

As illustrated hereinabove, various arrangements of layers and constructions of each photosensitive material can be selected.

A preferred silver halide, which is contained in photographic emulsion layer of photosensitive material used in the present invention, is silver bromoiodide, silver chloroiodide or silver bromochloroiodide containing approximately 30 mole % or less of silver iodide. A particularly preferred silver halide is silver bromoiodide or silver bromochloroiodide containing approximately 2 to 25 mole of silver iodide.

Silver halide grains in the photographic emulsion may be of regular forms such as cubic, octahedral or tetradecahedral grains, of irregular forms such as spherical or tabular grains, of crystal defect such as crystal twinning, or of complex forms thereof.

The size of the silver halide grains is not limited, for example the size may vary from fine-grain of approximately 0.2 μm or less to large size grain of 10 μm in projected surface area, and there may be a polydispersed emulsion or monodispersed emulsion.

The silver halide photographic emulsion in the present invention can be prepared in any manner, e.g. by the method described in Research Disclosure (R.D.) No. 17643 (December, 1978), pp. 2–23, "I. Emulsion Preparation and Types", ibid. No. 18716 (Nov. 1979), p. 648, P. Glafkides, *Chimie et Physique Photographique*, Paul Montel (1967), G. F. Duffin, *Photographic Emulsion Chemistry* (Focal Press, 1966) and V. L. Zelikman et al., *Making and Coating photographic Emulsion*, Focal Press, 1964).

A monodispersed emulsion as described in U.S. Pat. Nos. 3,574,628, 3,655,394 and British Patent No. 1,413,748 is preferable.

It is preferable to use tabular grains having an aspect ratio of approximately 5 or more, because of exerting interlayer effect and exhibiting edge effect. A total amount of silver halide of 3-8 g/m² is preferable. When using tabular grain in the high-sensitive emulsion layer, total amount of the high-sensitive emulsion layer preferably should be 0.1~5 g/m² as calculated with silver weight. Excess amount thereof causes fog-formation and difficult to exhibit edge effect. Tabular grain can easily be prepared by the method as described in Gutoff, *Photographic Science and Engineering*, 14:248-257 (1970), U.S. Pat. Nos. 4,434,226, 4,414,310, 4,433,048, 4,439,520 and British Patent No. 2,112,157.

A multi-structural grain of silver halide having a layer of higher content of silver iodide of about 3~30 mole % at inner part of grain is preferable. Also, grains preferably may be used grains having a layer of lower content of silver iodide near the surface thereof, and having a thin layer of 7 mole % or more or a locally concentrated distribution of higher content of silver halide on the surface thereof, preferably with an aspect ratio of 5:1.

The crystalline structure may be uniform, consisting of different compositions of halogen, or layer structure.

It may also be a silver halide contacted with different compositions by epitaxial contact, or with a compound other than silver halide such as silver rhodanide and lead oxide.

Various crystalline grain mixtures also can be used.

Silver halide emulsions are usually treated by physical ripening, chemical ripening and spectral sensitization. Reagents used in these processes are described in R.D. No. 17643 and 18716, whose corresponding parts are illustrated in the table hereinbelow.

The known additives for photograph also are described in the two volumes of R.D. hereinabove, and relating parts thereof are illustrated in the following table.

| Additives | R.D. No. 17643 | R.D. No. 18716 |
|---|---|---|
| 1 chemical sensitizer | p. 23 | p. 648, right column |
| 2 sensitizer | — | p. 648, right column |
| 3 spectral sensitizer, supersensitizer | pp. 23–24 | p. 648, right column to p. 649, right column |
| 4 bleaching agent | p. 24 | — |
| 5 anti-fogging agent and stabilizer | pp. 24–25 | p. 649, right column |
| 6 light absorption agent, filter dye, ultraviolet light absorbing agent | pp. 25–26 | p. 649, right column to p. 650, left column |
| 7 stain preventing agent | p. 25, right column | p. 650, left to right column |
| 8 dye image stabilizer | p. 25 | — |
| 9 hardener | p. 26 | p. 651, left column |
| 10 binder | p. 26 | p. 651, left column |
| 11 plasticizer, lubricant | p. 27 | p. 650, right column |
| 12 auxiliary coating agent, surface active agent | pp. 26–27 | p. 650, right column |
| 13 static mark preventing agents | p. 27 | p. 650, right column |

In order to prevent degradation of photographic performance by formaldehyde gas, a compound which can react with and fix formaldehyde preferably is added in photosensitive materials, as is described in U.S. Pat. Nos. 4,411,987 and 4,435,503.

Various color couplers can be used in the present invention, and examples thereof are described in the referenced patents cited in R.D. No. 17643, VII-C~G hereinbefore.

Preferable examples of yellow couplers are the compounds, for example, as described in U.S. Pat. Nos. 3,933,501, 4,022,620, 4,326,324, 4,401,752, 4,248,961, Japanese Patent Examined Publication No. 58-10739, British Patent Nos. 1,425,020 and 1,476,760, U.S. Pat. Nos. 3,973,968, 4,314,023 and 4,511,649 and European Patent No. 249,473A.

Preferable examples of magenta couplers are 5-pyrax-olone couplers or pyrazoloazole couplers as described in U.S. Pat. Nos. 4,310,619 and 4,351,897, European Patent No. 73,636, U.S. Pat. Nos. 3,061,432, 3,725,067, R.D. No. 24220 (June 1984), Japanese Patent Laid-open Publication No. 60-33552, R.D. No. 24230 (June 1984), Japanese Patent Laid-open Publication Nos. 60-43659, 61-72238, 60-35730, 55-118034, 60-185951, U.S. Pat. Nos. 4,500,630, 4,540,654, 4,556,630, PCT International Publication No. WO88/04795.

Examples of cyan couplers are phenol couplers and naphthol couplers as described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, and 4,327,173, German Patent Publication (OLS) No. 3,329,729, European Patent Nos. 121,365A, 249,453A, U.S. Pat. Nos. 3,446,622, 4,333,999, 4,775,616, 4,451,559, 4,427,767, 4,690,889, 4,254,212, 4,296,199, and Japanese Patent Laid-open Publication No. 61-42658.

Preferable examples of colored couplers capable of correcting unwanted absorption of coloring dyes are R.D. No. 17643, VII-G. U.S. Pat. No. 4,163,670 Japanese Patent Examined Publication No. 57-39413, U.S. Pat. Nos. 4,004,929, 4,138,258 and 1,146,368. A coupler which can correct unwanted absorption of coloring dyes by released fluorescent dye in coupling, as described in U.S. Pat. No. 4,774,181, or a coupler having removal group of dye-precursor which can yield a color dye by reaction with developing agents as described in U.S. Pat. No. 4,777,120 is preferable.

Preferable couplers having suitable colored dye diffusibility are described in U.S. Pat. No. 4,366,237, British Patent No. 2,125,570, European Patent No. 96,570 and German Patent Publication (OLS) No. 3,234,533.

Polymerized dye forming couplers are described in U.S. Pat. Nos. 3,451,820, 4,080,211, 4,367,282, 4,409,320, 4,576,910, and British Patent No. 2,102,173.

Couplers which release photographically useful residue with the coupling reaction are preferably used in the present invention. Preferable examples of DIR coupler which releases a development restrainer are described in the patents cited in R.D. No. 17643, VII-F, i.e. Japanese Patent Laid-open Publication Nos. 57-151944, 57-154234, 60-184248, and 63-37346, U.S. Pat. Nos. 4,248,962 and 4,782,012.

Preferable examples of couplers which release speck former or development accelerator over the image while processing are described in British Patent Nos. 2,097,140, 2,131,188, and Japanese Patent Laid-open Publication Nos. 59-157638 and 59-170840.

Further examples of coupler used in photosensitive material in the present invention are: competing coupler (U.S. Pat. No. 4,130,427), multi-equivalent coupler (U.S. Pat. Nos. 4,283,472, 4,338,393 and 4,310,618), DIR redox compound releasing coupler (Japanese Patent Laid-open Publication Nos. 60-185950 and 62-24252), DIR coupler releasing coupler. DIR coupler releasing redox coupler or DIR redox releasing redox coupler, coupler which releases coloring dye recovering color after removal (EP No. 173,302A), bleaching accelerator releasing coupler (R.D. No. 11449, ibid. 24241, Japanese Patent Laid-open Publication No. 61-201247), ligand releasing coupler (U.S. Pat. No. 4,553,477), leuco-dye releasing coupler (Japanese Patent Laid-open Publication No. 63-757479) and fluorescent dye releasing coupler (U.S. Pat. No. 4,774,181).

Couplers used in the present invention can be introduced into photosensitive materials by known dispersion methods.

Examples of high boiling point solvent used in the oil-in-water dispersion method are described in U.S. Pat. No. 2,322,027.

Examples of high boiling point organic solvents used in the oil-in-water dispersion method, having melting point over 175° C. at ambient atmosphere, are: phtalate diester such as dibutylphthalate, dicyclohexylphthalate, di-2-ethylhexylphthalate, decylphthalate, bis(2,4-di-t-amylphenyl)phthalate, bis(2,4-di-t-amylphenyl)isophthalate, bis(1,1-diethylpropyl)phthalate; phosphate or phosphonate ester such as triphenylphosphate, tricredylphosphate, 2-ethylhexyldiphenylphosphate, tricyclohexylphosphate, tri-2-ethylhexylphosphate, tridodecylphosphate, tributoxyethylphosphate, trichloropropylphosphate or di-2-ethylhexylphenyl phosphonate; benzoate ester such as 2-ethylhexylbenzoate, dodecylbenzoate or 2-ethylhexyl-p-hydroxy-benzoate; amides such as N,N-diethyldodecaneamide, N,N-diethyl-laurylamide or N-tetradecylpyrrolidone; alcohols or phenols such as isostearylalcohol or 2,4-di-tert-amylphenol; aliphatic carboxylate esters such as bis(2-ethylhexyl)sebacate, dioctylazelate, glyceroltributylate, isostearyllactate or trioctylcitrate; aniline derivatives such as N,N-dibutyl-2-butoxy-5-tert-octylaniline; hydrocarbons such as paraffin dodecylbenzene or diisopropylnaphthalene.

Examples of auxiliary solvent include an organic solvent having a boiling point over approximately 30° C. preferably over approximately 50° C. to below approximately 160° C., and include ethyl acetate, butyl acetate, ethyl propionate, methyl ethyl ketone, cyclohexanone, 2-ethoxyethyl acetate or dimethyl formamide.

A process and effect of latex dispersion method, and examples of latex for impregnation are described in U.S. Pat. No. 4,199,363, German OLS Nos. 2,541,274 and 2,541,230.

It is preferable to add, in a color photosensitive material in the present invention, antibacterial or antifungal agents such as 1.2-benzisothiazoline-3-on, n-butyl-p-hydroxybenzoate, phenol, 4-chloro-3,5-dimethylphenol, 2-phenoxyethanol and 2-(4-thiazolyl)-benzimidazole, as described in Japanese Patent Laid-open Publication Nos. 63-257747, 62-272248 and 1-80941. The present invention can be applied in various color photosensitive materials. Examples are color negative film for still photography or movie, color reversal film for slide or TV. color paper, color positive film and color reversal paper.

A preferable support used in the present invention is described in R.D. No. 17643, page 28 and No. 18716, p. 647 right column to p. 648 left column.

In the photosensitive materials of the present invention, a total sum of thickness of hydrophilic colloid layers on the side of emulsion layer is 28 μm or less, more preferably below 20 μm. A swelling rate of film membrane $T_{\frac{1}{2}}$ is preferably below 30 seconds, more preferably below 20 seconds. A thickness of layers means the value measured at 25° C., relative humidity 55% for 2 days, and a swelling rate of film membrane $T_{\frac{1}{2}}$ can be measured by a method known in the technical field. For example, a swellometer as described in A. Green et al., Photogr. Sci. Eng., 19(2), pp. 124–149, can be used. $T_{\frac{1}{2}}$ is defined as time for reaching ½ thickness of the saturated film membrane, which is 90% of maximum swelling film membrane thickness measured by treating with color developer at 30° C. for 3 min. 15 sec. The film membrane swelling rate $T_{\frac{1}{2}}$ can be adjusted by adding hardener to binder gelatin, or controlling the time after spreading. The preferable swelling ratio is 150–400%. The swelling ratio can be calculated according to a maximum swelling film membrane thickness under the condition hereinabove, by an equation: (thickness of maximum swelling film membrane-thickness of film membrane)/thickness of film membrane.

Photographic Processing of Color Photosensitive Materials

The photographic processing of color photographic photosensitive material of the present invention now will be described.

Any general processing procedures, those described in R.D. No. 17643, pp. 28–29, and No. 18716, p. 615 left to right columns, can be used.

Color developing solutions for processing the photosensitive material according to the present invention preferably are alkaline aqueous solutions containing primary aromatic amine color developing agents. Examples of these agents are aminophenol compounds or preferably p-phenylenediamine compounds, and are 3-methyl-4-amino-N,N-diethylaniline, 3-methyl-4-amino-N-ethyl-N-β-hydroxyethylaniline 3-methyl-4-amino-N-ethyl-N-β-methanesulfonamide ethylaniline, 3-methyl-4-amino-N-ethyl-β-methoxyethylaniline, and sulfate, chloride or p-toluenesulfonate thereof. One preferable example is 3-methyl-4-amino-N-ethyl-N-β-hydroxyethylaniline sulfate. These compounds can be combined with each other.

The color developing solutions further can contain pH buffering agents such as carbonates, borates and phosphates of alkali metals, and developing restrainer or anti-fogging agents such as chloride, bromide, iodide, benzimidazoles, benzothiazoles or mercapto compounds. Also, the color developing solutions can contain, if necessary, preservatives such as hydroxylamine, diethylhydroxylamine, sulfite, hydrazines (N,N-biscarboxymethylhydrazine, etc.), phenyl semicarbazides, triethanolamine and cathechol sulfonates; organic solvent such as ethyeneglycol and diethyleneglycol; development accelerators such as benzyl alcohol, polyethylene glycol, quaternary ammonium salts and amines; dye forming couplers; competing couplers, auxiliary developing agents such as 1-phenyl-3-pyrazolidone; viscosity-imparting agents, chelating agents such as aminopolycarboxylic acid, aminopolyphosphonic acid, alkylphosphonic acid and phosphono carboxylic acid, for example ethylenediamine tetraacetate, nitrylo triacetate, diethylenetriamine pentaacetate, cyclohexanediamine tetraacetate, hydroxyethylimino diacetate, 1-hydroxyethylidine-1,1-diphosphonate nitrilo-N,N,N-trimethylene phosphonate, ethylenediamine-N,N,N,N-tetramethylene phosphonate, ethylenediamine-di(o-hydroxyphenyl acetate) and salts thereof.

Color reversal photosensitive materials are reverse treated by general color development after monochrome developing. In the monochrome developing solutions, known monochrome developing solutions, for example dihydroxybenzenes such as hydroquinone, 3-pyrazolidones such as 1-phenyl-3-pyrazolidone, or aminophenols such as N-methyl-p-aminophenol can be used alone or in combination with each other.

These color developing solutions and monochrome developing solutions in general have a pH from 9–12. An amount of developer supplied, though depending upon treating color photographic photosensitive materials, generally is below 3 liters per 1 m² of photosensitive materials, and it can be reduced below 500 ml by decreasing bromide ion concentration in the supplied solution. It is preferable to prevent evaporation and air oxidation of liquid by controlling to lessen the contact area of developing layers with air in case of decreasing supplied liquid.

The contact area of air and developing solutions in troughs can be defined by the following definition; e.g., ratio of open field.

$$\text{Ratio of open field} = \frac{\text{contact area with air and developer (cm}^2\text{)}}{\text{volume developer (cm}^3\text{)}}$$

The above ratio preferably is below 0.1, and more preferably 0.001–0.05. In order to reduce the ratio, a barrier such as a floating plate is to be set on the surface of the developing solution. Another method to use movable cover as described in Japanese Patent Laid-open Publication No. 1-82033 or a slit development method as described in Japanese Patent Laid-open Publication No. 63-216050 can be mentioned. It is preferable to apply the reduced ratio of open field in the processes of color development and monochrome development, and further in the following processes such as bleaching, bleach-fixing, fixing, water washing and stabilizing. An amount of supplied solution can be reduced by suppressing the accumulation of bromide ions in a developer.

Color developing time generally is set to be 2~5 min., and it can be reduced by treating at higher temperature, higher pH. and higher concentration of color developing agents.

After color development, the photographic emulsion layer is usually bleached. This bleach processing may be performed simultaneously with a fix processing (bleach-fix processing), or they may be performed independently. Further, in order to stimulate treatment, bleach-fixing may be applied after bleaching. It can optionally be performed to treat with bleach-fixing, or to bleach after bleach-fixing. Bleaching agents which can be used include compounds of polyvalent metals such as iron (III), peracids, quinons and nitro compounds. As for preferred examples of bleaching agents, organic complex salts of iron (III), for example complex salts of aminopolycarboxylic acids such as ethylenediaminetetraacetic acid, diethylenetriaminepeptaacetic acid, cyclohexanediaminetetraacetic acid, methyliminodiacetic acid, 1,3-diaminopropanoltetraacetic acid and glycolether diaminetetraacetic acid or complex salts of organic acids such as citric acid, tartaric acid and malic acid can be used. Among these, aminopolycarboxylate-iron(III) complex salts such as ethylenediaminetetraacetate-iron(III) complex salts and 1,3-diaminopropanol-tetraacetate-iron (III) complex salts are preferable in view of rapid treatment and prevention of pollution. Aminopolycarboxylate-iron(III) complex salt is very advantageous in bleaching solution and bleach-fixing solution. A pH of bleaching solution or bleach-fixing solution using the said aminopolycarboxylate-iron (III) complex salts is in general pH 4.0–8, and it can be treated at lower pH for rapid treatment.

Bleaching accelerator optionally can be used in bleaching solution, bleach-fixing solution or prior-solution thereof. Preferable bleaching accelerators are exemplified in the following patent specifications: compounds having mercapto or disulfide group as described in U.S. Pat. No. 3,893,858, German Patent 1,290,812, 2,059,988, Japanese Patent Laid-open Publication Nos. 53-32736, 53-57831, 53-37418, 53-72623, 53-95630, 53-95631, 53-104232, 53-124424, 53-141623, 53-28426, and R.D. No. 17129 (July 1978); thiazolidine derivatives as described in Japanese Patent Laid-open Publication No. 59-140129; thiourea derivatives as described in Japanese Patent Examined Publication No. 45-8506, Japanese Patent Laid-open Publication Nos. 52-20823, 53-32735, and U.S. Pat. No. 3,706,561; iodide in German Patent 1,127,715 and Japanese Patent Laid-open Publication No. 58-16235; and polyamine compounds as described in German Patent 966,410 and 2,748,430; and compounds as described in Japanese Patent Laid-open Publication Nos. 49-42434, 49-59644, 53-94927, 54-35727, 55-26506 and 58-163940; and bromide ion. Among these, the compounds having mercapto or disulfide group are preferable in view of acceleration effect, and the compounds as described in U.S. Pat. No. 3,893,858, German Patent 1,298,812 and Japanese Patent Laid-open Publication No. 53-95630 are preferable. Further compounds as described in U.S. Pat. No. 4,552,834 are also preferable. These bleach-accelerating agents can be added in photosensitive materials. These bleaching accelerators are especially effective in bleach-fixing treatment of color photosensitive materials for photographing.

Among others, organic acid preferably is contained in bleaching solution and bleach-fixing solution for the purpose of preventing bleach-staining. Preferable organic acids are compounds having an acid dissociation constant (pka) 2–5, for example acetic acid, propionic acid, and the like.

Examples of fixing agents used in fixing solution or bleach-fixing solution are thiosulfate, thiocyanate, thioether compounds, thioureas and a large amount of iodides. Thiosulfate is generally used, and ammonium thiosulfate is most widely used. It is preferable to use thiosulfate in combination with thiocyanate, thioether compounds or thiourea. Preferable preservatives for fixing solution and bleach-fixing solution are sulfite, bisulfite, carbonyl bisulfite adduct, or sulfonate as described in European Patent 294,769A. Further, aminopolycarboxylates and organic phosphonates preferably can be added in fixing solution or bleach-fixing solution for the purpose of stabilizing the solution. Total desilver-processing time preferably should be shorter within the range for avoiding incomplete desilvering. A preferable time is 1–3 min., more preferably 1–2 min. The treatment temperature should be 25°–50° C., preferably 35°–45° C. In the preferable temperature range the desilvering rate is improved and stain-formation after treatment can effectively be prevented.

During the desilvering process, stirring should be greatly intensified. Methods of intense stirring are: a method of making a jet-stream of treatment solution collide with emulsion layer of photosensitive materials as described in Japanese Patent Laid-open Publication Nos. 62-183460 and 62-183461; a method of enlarging a stirring effect by rotary means as described in Japanese patent Laid-open Publication No. 62-183461; a method of enlarging a stirring effect by turbulating the emulsion surface by moving the photosensitive materials simultaneously contacting with emulsion layer the wiper blade set in a solution; and a method of increasing the whole circulating volume of solution. These means of enlarging the stirring are effective in bleaching solution, bleach-fixing solution and fixing solution. Enlarging the stirring may result speed up in supplying bleaching solution and fixing solution in emulsion film membrane layers and as a result desilvering rate can be accelerated. Stirring enlarging means are more effective when bleaching accelerating agents are used, and accelerating effect can be improved. Inhibiting action for fixing by bleaching accelerating agent can be solved.

An automatic developing machine used for the photosensitive materials in the present invention preferably has means for transferring photosensitive materials as described in Japanese Patent Laid-open Publication Nos. 60-191257, 60-191258 and 60-191259. As described in Japanese Patent Laid-open Publication No. 60-191257, such like transferring means can reduce transfer of developing solution from prebath to post bath, and hence effect of preventing deterioration of developing solution is superior. These effects are advantageous for shortening the treatment time in the processes and reducing the amount of supplied solution.

Silver halide color photographic materials in the present invention generally are treated by water washings and/or stabilizing process after desilvering treatment. The amount of water in water washing process can be set variously according to the special characteristics of photosensitive materials. e.g., materials such as couplers, etc., use thereof, washing temperature, number of water washing tanks (number of plate), method of supplying solutions, such as counterflow or normal flow, and other conditions. Among these, a relation between the number of water washing tanks and the amount of water in the multistep counterflow method is referred to in J. Soc. Motion Picture and Television Eng., 64:248-253 (May 1955).

According to the multistep counterflow method hereinabove, the amount of washing water can be reduced: however, there is a disadvantage that suspended materials from grown bacteria due to increasing remaining time of water in a tank are generated and adhere to the photosensitive materials. In the treatment of color photosensitive materials in the present invention, a method of reducing calcium and magnesium ions as described in Japanese Patent Laid-open Publication No. 62-28883 can be applied advantageously. Germicides, for example, chlorine type germicides such as isothiazolones, thiabendazoles or sodium isocyanuric chloride, and benzotriazole, as described in Horiguchi, H., *Chemistry of Antibacterial and Antifungal Agents* (1986), Sakyo Publ., Hygienic Tech. Assoc.. *Sterilization, Pasteurization and Fungicidal Technology* (1982), and Nippon Antibacterial and Antifungal Assoc., *Dictionary of Antibacterial and Antifungal Agents* (1986).

A pH of water washing in the treatment of photosensitive materials in the present invention is pH 4-9 preferably pH 5-8. The temperature and washing time of water can be varied according to specific characteristics of photosensitive materials and use thereof, and is generally in the range of 14°-45° C. for 20 sec. to 10 min., preferably at 25°-40° C. for 30 sec. to 5 min. Further, photosensitive materials of the present invention can be treated directly with stabilizing agents in place of water washings, for example as known from the method described in Japanese Patent Laid-open Publication Nos. 57-8543, 58-14834 and 60-220345.

Additional stabilizing treatment can be applied followed by water washing hereinabove. One example thereof is a stabilizing treatment, used for the final treatment of photographic color photosensitive materials, containing dye-stabilizing agents and surface active agents. Examples of dye-stabilizing agents are aldehyde such as formalin or glutaraldehyde, N-methylols, hexamethylenetetramine or aldehyde sulfite adduct.

Chelating agents and antifungal agents can be added to the stabilizing solution.

Overflowed liquids in water washings and/or supplied stabilizing solution can be recycled in other process such as desilvering process.

Concentration of solutions by evaporation in any process in automatic development machine can preferably be compensated by adding water.

The silver halide color photographic sensitive materials in the present invention may contain color developing agents for the purpose of simplifying and speeding-up the treatment. Each precursor for color developing agents can be used. For example, indoaniline compounds as described in U.S. Pat. No. 3,342,597, Schiff alkali type compounds as described in U.S. Pat. No. 3,342,599, R.D. No. 14850 and 15159, aldol compound as described in R.D. No. 13924, metal salt complex as described in U.S. Pat. No. 3,719,492 and urethanes as described in Japanese mentioned.

Silver halide color photosensitive materials in the present invention may contain 1-phenyl-2-pyrazolidones in order to stimulate color developing. Typical examples are described in Japanese Patent Laid-open Publication Nos. 56-64339, 57-144547, and 58-115438.

Each treatment solution in the present invention can be used at 10°-50° C. In general, a temperature at 33°-38° C. is standard, but the treating time can be shortened by accelerating the treatment at higher temperature of improvement in quality of picture and stabilization of liquid at a lower temperature also can be performed. Further, in order to reduce silver in photosensitive materials, cobalt or hydrogen peroxide is added for processing as described in German patent No. 2,226,770 and U.S. Pat. No. 3,674,499.

The silver halide photosensitive materials in the present invention can be applied to heat-developing photosensitive materials as described in U.S. Pat. No. 4,500,626, Japanese Patent Laid-open Publication Nos. 60-133449, 59-218443, 61-238056 and European Patent 210660A2.

Preparation of Color Photosensitive Materials in the Present Invention

On a cellulose triacetate film support having been undercoated, there was prepared a multilayer color photographic material (Sample (1)) consisting of the following layers.

Composition of Photosensitive Layer

The amount of silver coated in silver halide and colloidal silver is expressed as $g/m^2$, that of coupler. additives and gelatin is expressed as $g/m^2$, and that of sensitizing dye is expressed as mole per mole of silver. Abbreviations of additives are shown hereinbelow. In case of having multiple effects, the one represented is mentioned.

UV: ultraviolet light absorbing agent, Solv: high boiling point organic solvent, ExF: magenta coupler, ExY: yellow coupler, Cpd: additive.

1st layer: Anti-Halation Layer

| Black colloidal silver | 0.15 |
| --- | --- |
| Gelatin | 2.0 |
| ExM-6 | 0.2 |
| UV-1 | 0.03 |
| UV-2 | 0.06 |
| UV-3 | 0.07 |
| Solv-1 | 0.3 |
| Solv-2 | 0.08 |
| ExF-1 | 0.01 |

|  |  |
|---|---|
| ExF-2 | 0.01 |
| ExF-3 | 0.005 |

2nd layer: Low-Sensitive Red-Sensitive Emulsion Layer

Silver bromoiodide emulsion (AgI 4 mole %, homogeneous AgI type, average grain size 0.4 μm, size variation ratio 30%, tabular grains, diameter/thickness ratio 3.0),

|  |  |
|---|---|
| Silver coated | 0.37 |

Silver bromoiodide emulsion (AgI 6 mole %, core-shell ratio 2:1 inner-high AgI type, average grain size 0.45 μm, size variation ratio 23%, tabular grains, diameter/thickness ratio 2.0),

|  |  |
|---|---|
| Silver coated | 0.19 |
| Gelatin | 0.8 |
| ExS-1 | $2.3 \times 10^{-4}$ |
| ExS-2 | $1.4 \times 10^{-4}$ |
| ExS-5 | $2.3 \times 10^{-4}$ |
| ExS-7 | $4.2 \times 10^{-6}$ |
| ExC-1 | 0.17 |
| ExC-2 | 0.03 |
| ExC-3 | 0.009 |

3rd Layer: Intermediate-Sensitive Red-Sensitive Emulsion Layer

Silver bromoiodide emulsion (AgI 6 mole %, core-shell ratio 2:1 inner-high AgI type, average grain size 0.65 μm, size variation ratio 23%, tabular grains, diameter/thickness ratio 2.0),

|  |  |
|---|---|
| Silver coated | 0.65 |
| Gelatin | 1.0 |
| ExS-1 | $2.3 \times 10^{-4}$ |
| ExS-2 | $1.4 \times 10^{-4}$ |
| ExS-5 | $2.3 \times 10^{-4}$ |
| ExS-7 | $4.2 \times 10^{-6}$ |
| ExC-1 | 0.31 |
| ExC-2 | 0.01 |
| ExC-3 | 0.10 |

4th Layer: High-Sensitive Red-Sensitive Emulsion Layer

Silver bromoiodide emulsion (AgI 9.3 mole %, core-shell ratio 3:4:2 multi-structure grain, AgI containing amounts from inner side 24 mole %, 0 mole %, 6 mole %, average grain size 0.75 μm, size variation ratio 23%, tabular grains, diameter/thickness ratio 2.5)

|  |  |
|---|---|
| Silver coated | 1.5 |
| Gelatin | 1.4 |
| ExS-1 | $1.9 \times 10^{-4}$ |
| ExS-2 | $1.2 \times 10^{-4}$ |
| ExS-5 | $1.9 \times 10^{-4}$ |
| ExS-7 | $8.0 \times 10^{-6}$ |
| ExC-1 | 0.08 |
| ExC-4 | 0.09 |
| Solv-1 | 0.08 |
| Solv-2 | 0.20 |
| Cpd-7 | $4.6 \times 10^{-4}$ |

5th Layer: Interlayer

|  |  |
|---|---|
| Gelatin | 0.6 |
| Cpd-1 | 0.1 |
| Polyethylacrylate latex | 0.08 |
| Solv-1 | 0.08 |

6th Layer: Low-Sensitive Green-Sensitive Emulsion Layer

Silver bromide emulsion (AgI 4 mole %, homogeneous AgI type, average grain size 0.33 μm, size variation ratio 37%, tabular grains, diameter/thickness ratio 2.0)

|  |  |
|---|---|
| Silver coated | 0.18 |
| Gelatin | 0.4 |
| ExS-3 | $1.6 \times 10^{-4}$ |
| ExS-4 | $4.8 \times 10^{-4}$ |
| ExS-5 | $1 \times 10^{-4}$ |
| ExM-5 | 0.16 |
| ExM-7 | 0.03 |
| ExY-8 | 0.01 |
| Solv-1 | 0.06 |
| Solv-4 | 0.01 |

7th Layer: Intermediate-Sensitive Green-Sensitive Emulsion Layer

Silver bromoiodide emulsion (AgI 4 mole %, homogeneous AgI type, average grain size 0.55 μm, size variation ratio 15%, tabular grains, diameter/thickness ratio 4.0).

|  |  |
|---|---|
| Silver coated | 0.27 |
| Gelatin | 0.6 |
| ExS-3 | $2 \times 10^{-4}$ |
| ExS-4 | $7 \times 10^{-4}$ |
| ExS-5 | $1.4 \times 10^{-4}$ |
| ExM-5 | 0.17 |
| ExM-7 | 0.04 |
| ExY-8 | 0.04 |
| Solv-1 | 0.14 |
| Solv-4 | 0.01 |

8th Layer: High-Sensitive Green-Sensitive Emulsion Layer

Silver bromoiodide emulsion (AgI 8.8 mole %, ratio of silver amount 3:4:2 multi-structure grain, AgI content from inner size 24 mole %, 0 mole %, 3 mole %, average grain size 0.75 μm, size variation ratio 23%, tabular grains, diameter/thickness ratio 1.6)

|  |  |
|---|---|
| Silver coated | 0.7 |
| Gelatin | 0.8 |
| ExS-4 | $5.2 \times 10^{-4}$ |
| ExS-5 | $1 \times 10^{-4}$ |
| ExS-8 | $0.3 \times 10^{-4}$ |
| ExM-5 | 0.1 |
| ExM-6 | 0.03 |
| ExY-8 | 0.02 |
| ExC-1 | 0.01 |
| ExC-4 | 0.01 |
| Solv-1 | 0.25 |
| Solv-2 | 0.06 |
| Solv-4 | 0.01 |
| Cpd-7 | $1 \times 10^{-4}$ |
| Cpd-8 | 0.01 |

9th Layer: Interlayer

| Gelatin | 0.6 |
|---|---|
| Cpd-1 | 0.04 |
| Polyethylacrylate latex | 0.05 |
| Solv-1 | 0.02 |
| UV-4 | 0.03 |
| UV-5 | 0.04 |

10th Layer: Donor Layer of Interlayer Effect on Red-Sensitive Layer

Silver bromoiodide emulsion (AgI 8 mole %, core-shell ratio 2:1 inner-high AgI type, average grain size 0.65 μm, size variation ratio 25%, tabular grains, diameter/thickness ratio 2.0),

| Silver coated | 0.68; |
|---|---|

Silver bromoiodide emulsion (AGI 4 mole %, homogeneous AgI type, average grain size 0.4 μm, size variation ratio 30%, tabular grains, diameter/thickness ratio 3.0),

| Silver coated | 0.19 |
|---|---|
| Gelatin | 1.0 |
| ExS-3 | $6 \times 10^{-4}$ |
| ExM-10 | 0.19 |
| Solv-1 | 0.30 |
| Solv-6 | 0.03 |

11th Layer: Yellow Filter Layer

| Yellow colloidal silver | 0.06 |
|---|---|
| Gelatin | 0.8 |
| Cpd-2 | 0.13 |
| Solv-1 | 0.13 |
| Cpd-1 | 0.07 |
| Cpd-6 | 0.002 |
| H-1 | 0.13 |

12th Layer: Low-Sensitive Blue-Sensitive Emulsion Layer

Silver bromoiodide emulsion (AgI 4.5 mole %, homogeneous AgI type, average grain size 0.7 μm, size variation ratio 15%, tabular grains, diameter/thickness ratio 7.0),

| Silver coated | 0.3; |
|---|---|

Silver bromoiodide emulsion (AgI 3 mole %, homogeneous AgI type, average grain size 0.3 μm, size variation ratio 30%, tabular grains, diameter/thickness ratio 7.0),

| Silver coated | 0.15 |
|---|---|
| Gelatin | 1.8 |

| ExS-6 | $9 \times 10^{-4}$ |
|---|---|
| ExC-1 | 0.06 |
| ExC-4 | 0.03 |
| ExY-9 | 0.14 |
| ExY-11 | 1.00 |
| Solv-1 | 0.50 |

13th Layer: Interlayer

| Gelatin | 0.04 |
|---|---|
| ExY-12 | 0.20 |
| Solv-1 | 0.19 |

14th Layer: High-Sensitive Blue-Sensitive Emulsion Layer

Silver bromoiodide emulsion (AgI 10 mole %, inner-high AgI type, average grain size 1.0 μm, size variation ratio 25%, multi twin tabular grains, diameter/thickness ratio 2.0)

| Silver coated | 0.5 |
|---|---|
| Gelatin | 0.5 |
| ExS-6 | $1 \times 10^{-4}$ |
| ExY-9 | 0.01 |
| ExY-11 | 0.20 |
| ExC-1 | 0.01 |
| Solv-1 | 0.10 |

15th Layer: 1st Protective Layer

Fine grain size silver bromoiodide emulsion (AgI 2 mole %, homogeneous AgI type, average grain size 0.07 μm)

| Silver coated | 0.12 |
|---|---|
| Gelatin | 0.7 |
| UV-4 | 0.11 |
| UV-5 | 0.16 |
| Solv-5 | 0.02 |
| H-1 | 0.13 |
| Cpd-5 | 0.10 |
| Polyethylacrylate latex | 0.09 |

16th Layer: 1st Protective Layer

Fine grain size silver bromoiodide emulsion (AgI 2 mole %, homogeneous AgI type, average grain size 0.07 μm)

| Silver coated | 0.36 |
|---|---|
| Gelatin | 0.55 |
| Poly(methyl methacrylate) (grain diameter 1.5 μm) | 0.2 |
| Cpd-4 | 0.04 |
| W-4 | 0.02 |
| H-1 | 0.17 |

Each layer hereinabove contains stabilizing agent Cpd-3 (0.07 g/m²), surface active agents W-1 (0.006 g/m²), W-2 (0.33 g/m²) and W-3 (0.10 g/m²) as auxiliary agents for coating and emulsion dispersing agent.

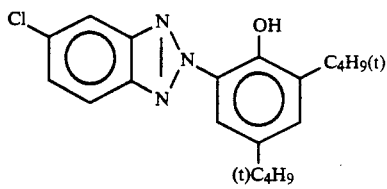
UV-1
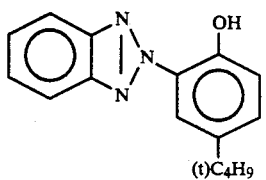
UV-2
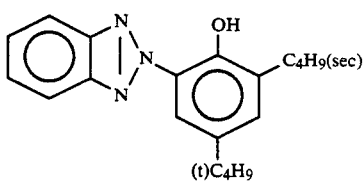
UV-3
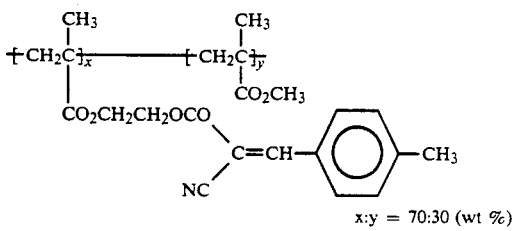
UV-4
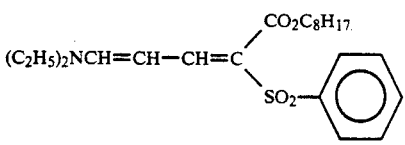
UV-5
tricresyl phosphate     Solv-1
dibutyl phtholate     Solv-2
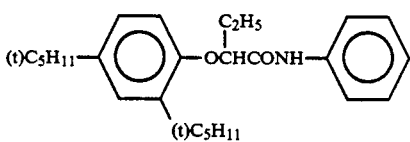
Solv-4
trihexyl phosphate     Solv-5
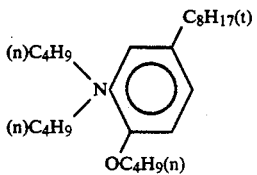
Solv-6

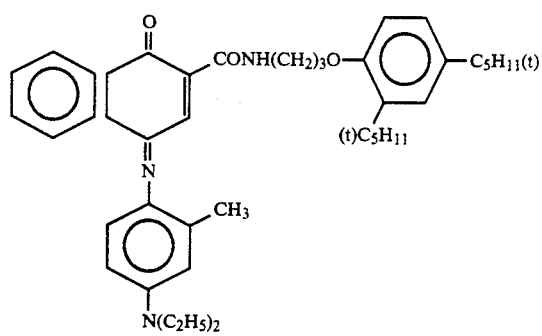
ExF-1
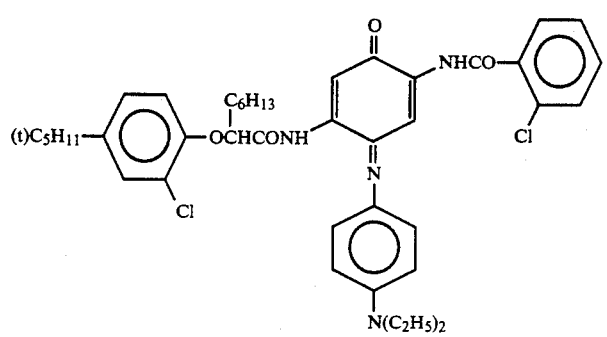
ExF-2
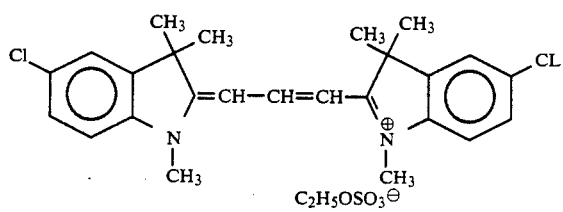
ExF-3
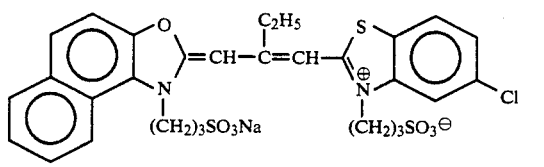
ExS-1
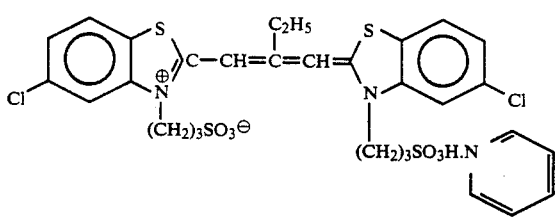
ExS-2
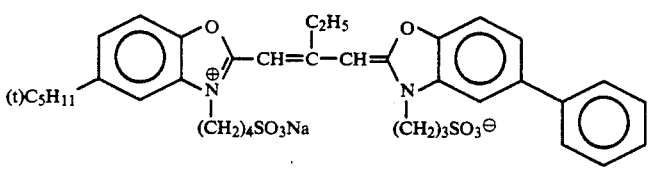
ExS-3
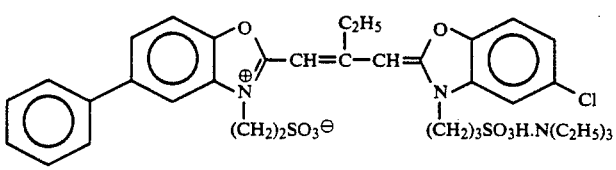
ExS-4

-continued
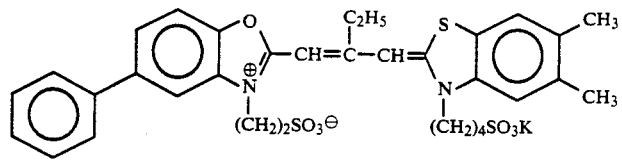 ExS-5
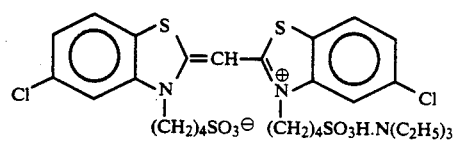 ExS-6
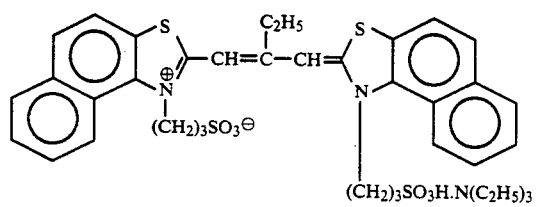 ExS-7
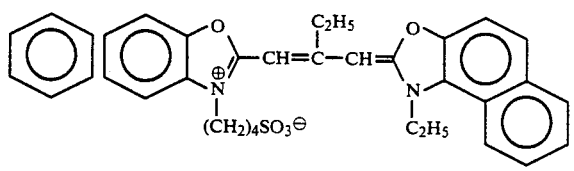 ExS-8
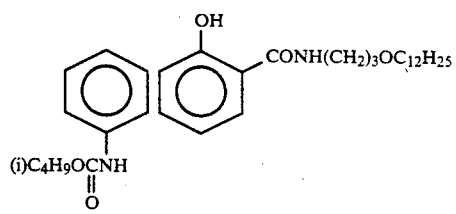 ExC-1
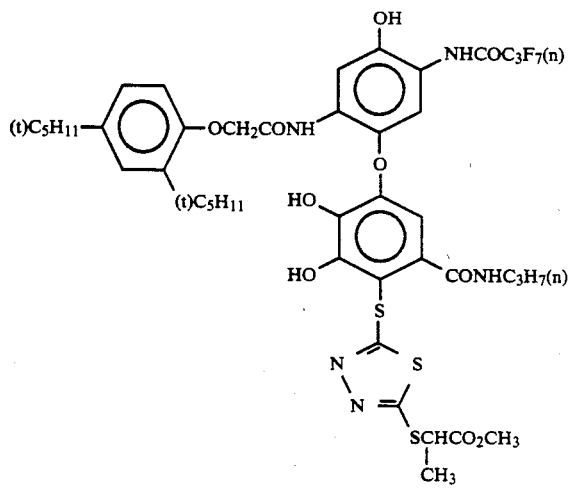 ExC-2

-continued
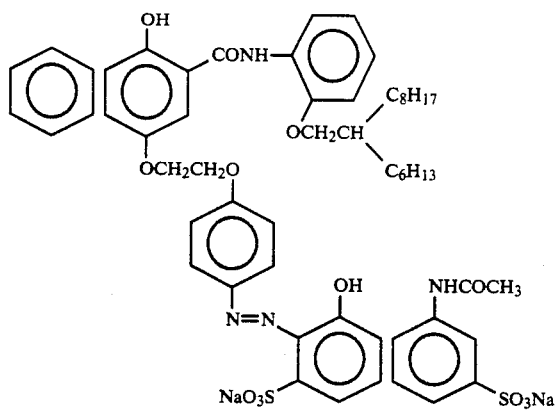
ExC-3
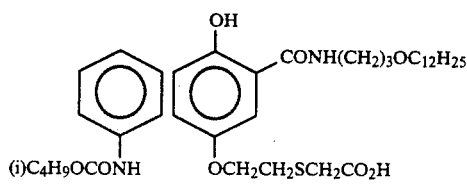
ExC-4
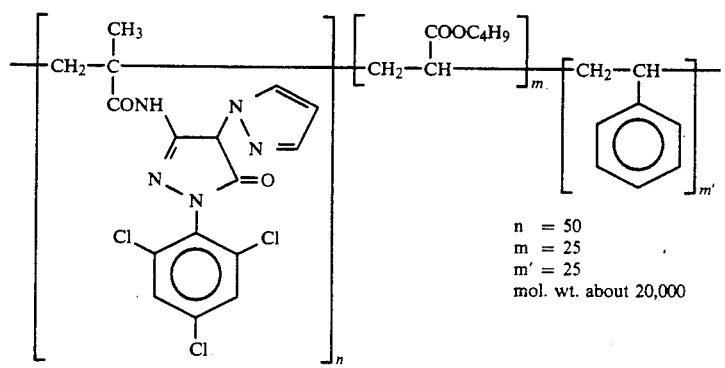
ExM-5
n = 50
m = 25
m' = 25
mol. wt. about 20,000
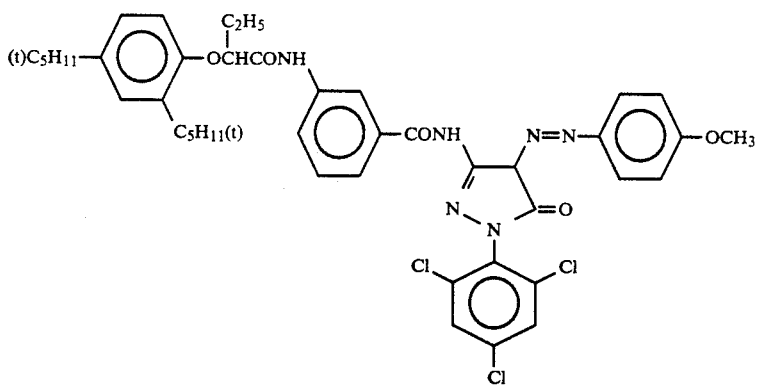
ExM-6
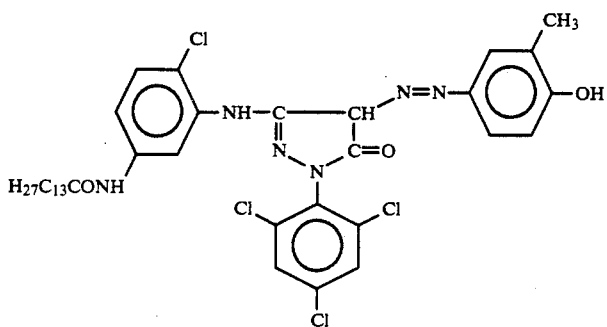
ExM-7

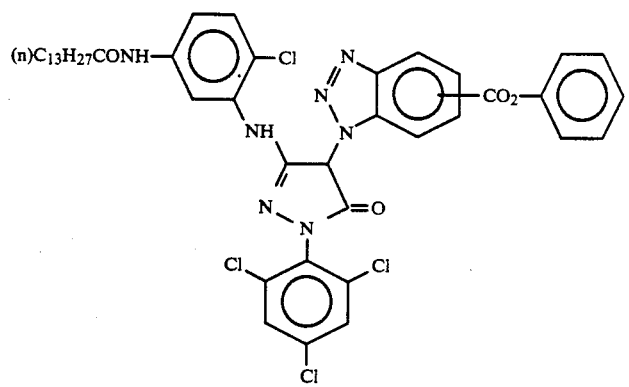
ExM-10
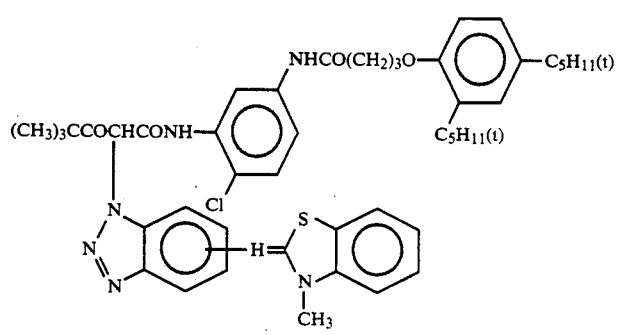
ExY-8
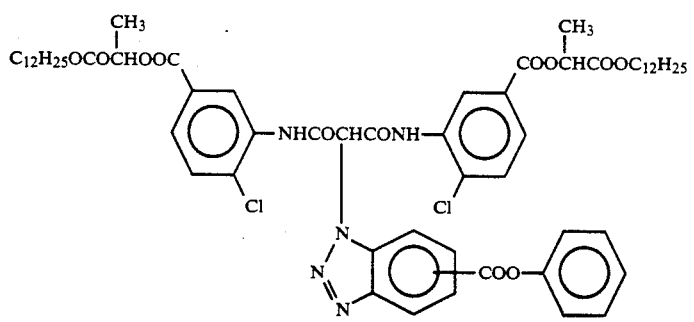
ExY-9
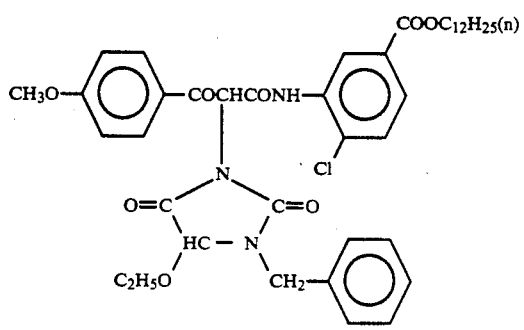
ExY-11

-continued
ExY-12
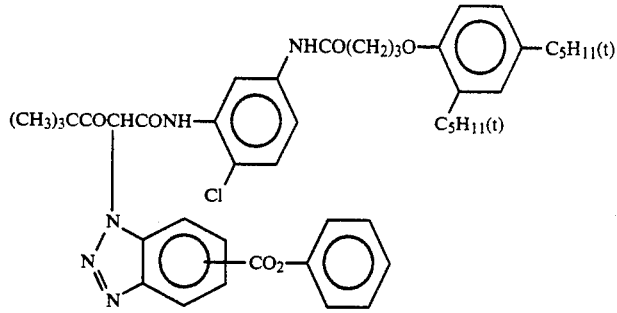
Cpd-1
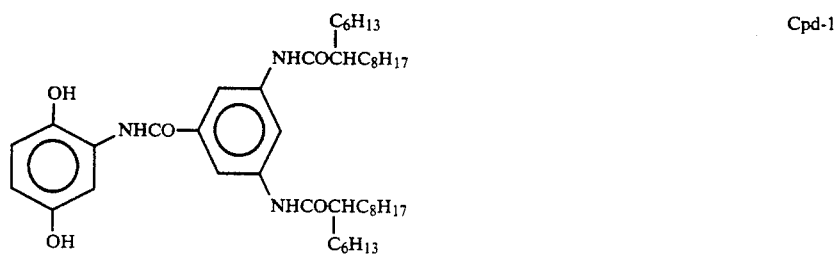
Cpd-2
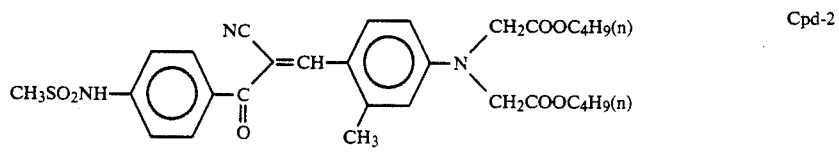
Cpd-3
Cpd-4
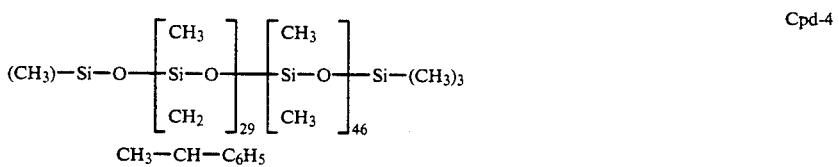
Cpd-5
Cpd-6
Cpd-7

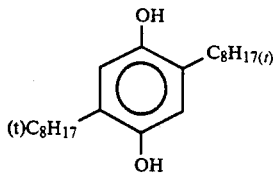

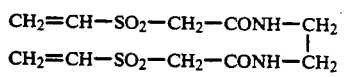

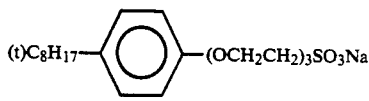

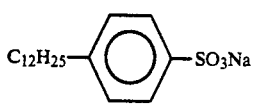

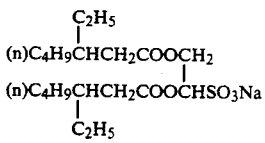

Cpd-8

H-1

W-1

W-2

W-3

W-4

In a photosensitive material sample (1), the composition used in 10th layer (FL) was replaced by the composition as shown in Table 1 to obtain Samples (2) and (3).

TABLE 1

| Samples | (1) | (2) | (3) |
|---|---|---|---|
| Silver bromoiodide emulsion (AgI 8 mole %) | 0.68 | 0.68 | 0.41 |
| Silver bromoiodide emulsion (AgI 4 mole %) | 0.19 | 0.19 | 0.11 |
| ExS-3 | $6 \times 10^{-4}$ | — | — |
| ExS-4 | — | $4 \times 10^{-4}$ | $4 \times 10^{-4}$ |
| ExS-5 | — | $1 \times 10^{-4}$ | $1 \times 10^{-4}$ |
| ExM-10 | 0.19 | 0.19 | 0.09 |
| λF (nm) | 525 | 550 | 550 |

Figure 20:
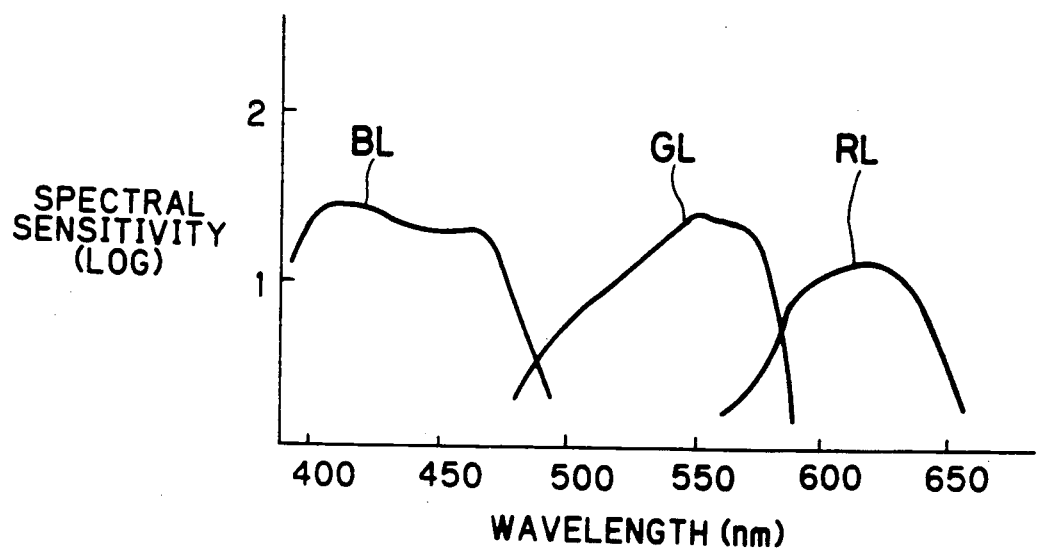
FIG. 20 is a graph showing a spectral sensitivity distribution of BL, GL, and RL of Sample (1)

The above samples were exposed to light in color temperature 4800° K. through an optical wedge, followed by color development according to a method shown in Table 2, and by conducting sensitometry using a status M densitometer. Sensitivity was ISO-125. Spectral sensitivity distribution curve was measured by using an equi-energy spectrosensitometer. The curve of Sample (1) is illustrated in FIG. 20. Those of Samples (2) and (3) were almost the same as that of Sample (1). The weighted-average wavelength of FL was 525 nm, which was calculated from another sample of single coated layer.

As shown hereinabove, after exposing the color photosensitive material, developing treatments were carried out according to the method shown in Table 2 by using an automatic developing machine, until the accumulated supplied liquor was three times as great as the volume of the mother liquor tank.

TABLE 2

| Process | Processing Time | Temp. | Amount of supply *1 | Tank volume |
|---|---|---|---|---|
| Color development | 3 min 15 sec | 38° C. | 33 ml | 20 l |
| Bleaching | 6 min 30 sec | 38° C. | 25 ml | 40 l |
| Water washing | 2 min 10 sec | 24° C. | 1200 ml | 20 l |
| Fixing | 4 min 20 sec | 38° C. | 25 ml | 30 l |
| Water washing (1) | 1 min 5 sec | 24° C. | *2 | 10 l |
| Water washing (2) | 1 min 0 sec | 24° C. | 1200 ml | 10 l |
| Stabilizing | 1 min 5 sec | 38° C. | 25 ml | 10 l |
| Drying | 4 min 20 sec | 55° C. | | |

*1: amount supplied per 1 m length with width 35 mm.
*2: counterflow piping from water washing trough (2) to water washing trough (1).

Compositions of treatment solution are shown hereinbelow.

| | Mother liquor (g) | Supplied liquor (g) |
|---|---|---|
| Color Developer | | |
| diethylenetriamine pentaacetic acid | 1.0 | 1.1 |
| 1-hydroxyethylidine-1,1-diphosphonic acid | 3.0 | 3.2 |
| sodium sulfite | 4.0 | 4.4 |
| potassium carbonate | 30.0 | 37.0 |
| potassium bromide | 1.4 | 0.7 |
| potassium iodide | 1.5 mg | — |
| hydroxylamine sulfate | 2.4 | 2.8 |
| 4-(N-ethyl-N-β-hydroxyethylamino)-2-methylaniline sulfate | 4.5 | 5.5 |
| add water to | 1.0 l | 1.0 l |
| pH | 10.05 | 10.10 |
| Bleaching Solution | | |
| ferric sodium ethylenediamine tetraacetate trihydrate | 100.0 | 120.0 |
| disodium ethylenediamine tetraacetate | 10.0 | 11.0 |
| ammonium bromide | 140.0 | 160.0 |
| ammonium nitrate | 30.0 | 35.0 |
| aq. ammonia (27%) | 6.5 ml | 4.0 ml |

-continued

|  | Mother liquor (g) | Supplied liquor (g) |
| --- | --- | --- |
| add water to | 1.0 l | 1.0 l |
| pH | 6.0 | 5.7 |
| Fixer | | |
| disodium ethylenediamine tetraacetate | 0.5 | 0.7 |
| sodium sulfite | 7.0 | 8.0 |
| sodium bisulfite | 5.0 | 5.5 |
| ammonium thiosulfate aqueous solution (70%) | 170.0 ml | 200.00 ml |
| add water to | 1.0 l | 1.0 l |
| pH | 6.7 | 6.6 |
| Stabilizer | | |
| formalin (37%) | 2.0 ml | 3.0 ml |
| polyoxyethylene-p-monononylphenyl ether (average degree of polymerization 10) | 0.3 | 0.45 |
| disodium ethylenediamine tetraacetate | 0.05 | 0.08 |
| add water to | 1.0 l | 1.0 l |
| pH | 5.0–8.0 | 5.0–8.0 |

Figure 21:
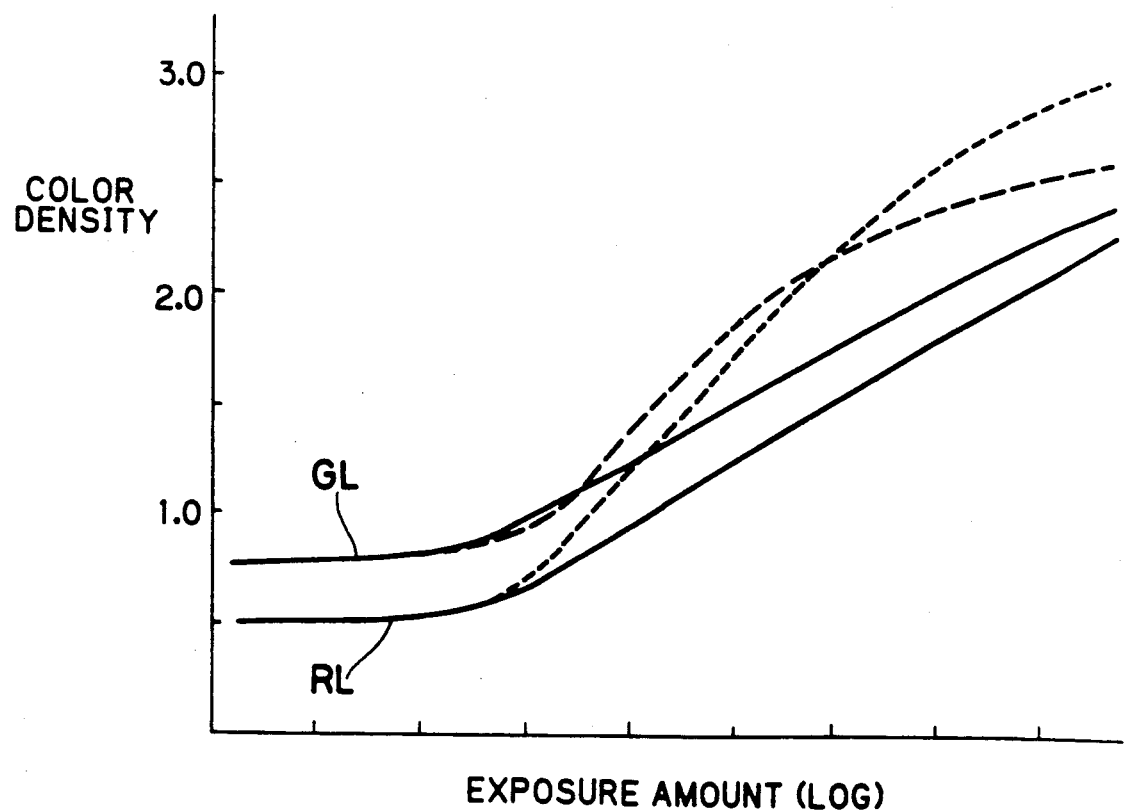
FIG. 21 is a graph showing characteristic curves of GL and RL under exposure through an optical wedge using Sample (1)

FIG. 21 shows characteristic curves (solid line) of GL and RL measured by using Sample (1) exposed to light of color temperature 4800° K. through an optical wedge, and characteristic curves (dotted line and broken line) of GL and RL with exposure to green light using green filter and red light using red filter through an optical wedge.

Figure 22:
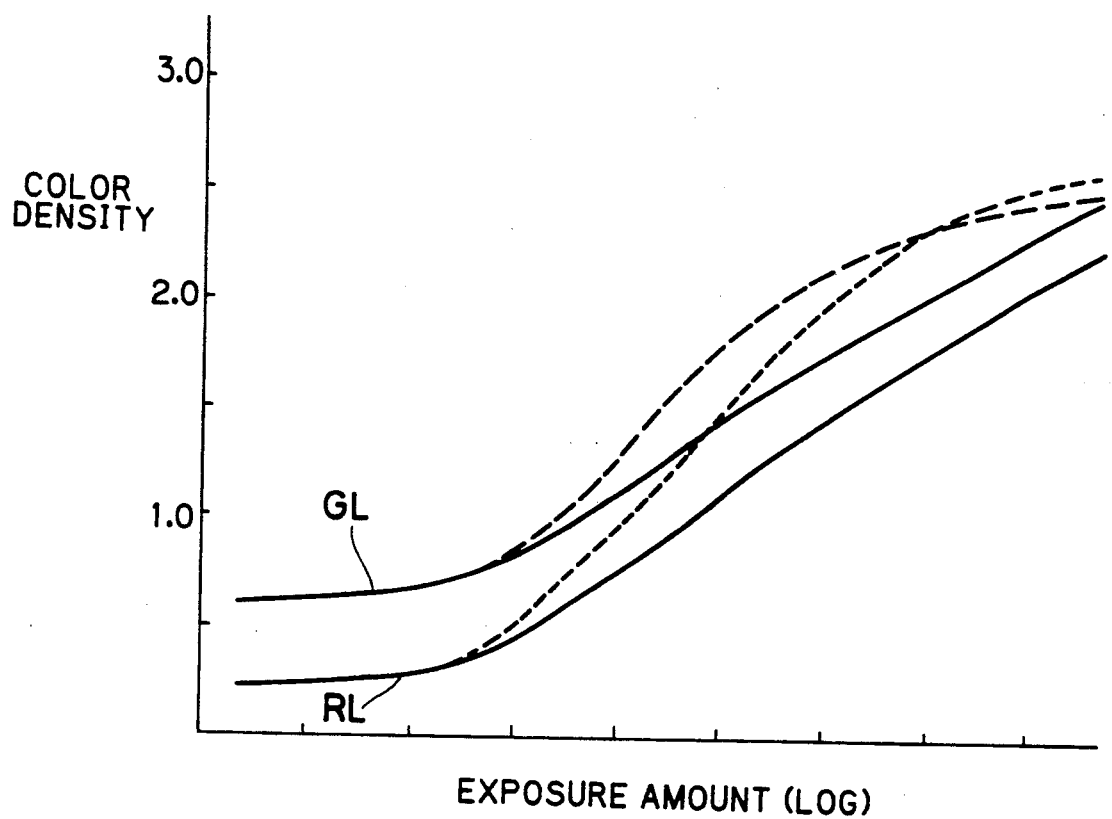
FIG. 22 is a graph showing characteristic curves of GL and RL under exposure through an optical wedge using Fujicolor HR (a merchandise name; manufactured by Fuji Photo Film Co., Ltd.)

FIG. 22 shows characteristic curves (solid line) of GL and RL measured by using FUJI PHOTO FILM, Fujicolor HR-100 (merchandise name), exposed to light of color temperature 4800° K. through an optical wedge, and characteristic curves (dotted line and broken line) of GL and RL with exposing green light and red light obtained by the same methods hereinbefore.

A gradation and color temperature of each silver halide emulsion layer differed depending on degree of exposure in white light and primary color light, and especially in Sample (1) of the present invention, greater differences in the toe part of color gradation and the halftone part and shadow part were observed.

In photosensitive material Sample (1), FL of the following composition was provided between the 2nd and 3rd layers.

| | |
| --- | --- |
| Silver bromoiodide emulsion (AgI 4 mole %, average grain size 0.55 μm, emulsion used in 7th layer) | 0.15 |
| Gelatin | 0.5 |
| ExS-2 | $1 \times 10^{-4}$ |
| ExS-7 | $5 \times 10^{-6}$ |
| ExC-2 | 0.05 |
| Solv-2 | 0.01 |

Further, the 10th layer was made with thin layer comprising the amount reduced to approx. 60–70% to obtain Sample (4).

Figure 23:
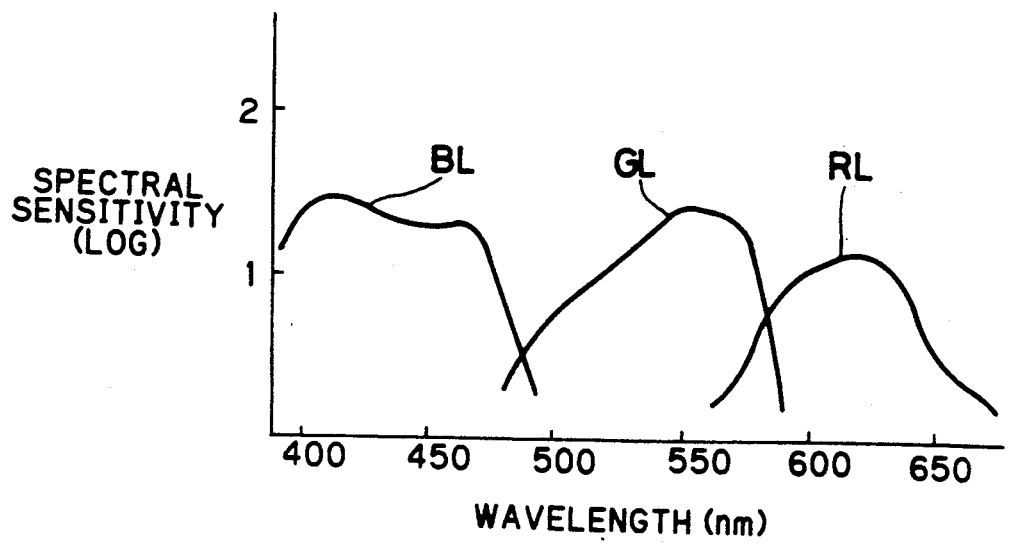
FIG. 23 is a graph showing the spectral sensitivity distribution of BL. GL, and RL of Sample (4).

In Sample (4), sensitometry and spectral sensitivity distributions were measured according to those of Sample (1). FIG. 23 shows spectral sensitivity distribution curves of BL, GL and RL of Sample (4). As clearly seen from FIG. 23, the spectral sensitivity distribution of BL and GL of Sample (4) is almost the same as that of Sample (1) shown in FIG. 20, whereas RL is tailing toward the long wavelength side as compared with Sample (1).

λF of FL provided between 2nd and 3rd layers was 652 μm, and λF of FL as set in 10th layer was 525 μm.

Photographing by a Camera according to the Present Invention

A single-lens reflex camera as shown in FIG. 8 was manufactured experimentally with a photographing frame divided into nine portions by the liquid crystal panel 100 in the finder, having a mechanism for recording a position of the principal object.

A sample of color photosensitive material for photographing, cut in a 135 size (35 mm wide, 124 cm long with perforation), was contained in a normal film cassette. When the film cassette was loaded in the camera, a photograph was taken with the principal object consisting of flowers, grass and a woman holding a Macbeth color chart at about 4 m of the object distance, for which the condition was an outdoor half-cloudy view field with a background image of a landscape. The film cassette storing the sample of photosensitive material was loaded in the experimental camera. A photograph was taken under each of the conditions A to C and A' to C'.

Condition A

The principal object being observed at the center of the frame in the finder, an exposure condition (shutter speed 1/125 sec, f-number 5.6, focal length of the lens 50 mm) is set in accordance with center-weighted metering. The principal object is focussed, and focussing is locked. The area in the 2nd row and the 2nd column is specified by operating the X- and Y-direction switches 105 and 106. The shutter release button is pushed to open/close the shutter. The principal object position information thereby consists in specifying the area in the 2nd row and the 2nd column. The discrimination number of this area is recorded onto the film by a form of bar code.

Condition B

A photograph is taken with the principal object being observed not at the center but at the lower left portion of the frame. With the principal object positioned at the center at first metering is carried out in a manner similar to Condition A so as to set an exposure condition. The principal object is focussed and focussing is locked. Thereafter, the principal object is observed at the lower left area of the frame. The area in the 3rd row and the 1st column where the principal object is positioned is specified by operating the X- and Y-direction switches 105 and 106. The shutter release button is pushed to open/close the shutter (shutter speed 1/125 sec, f-number about 6.3). The principal object position information thereby consists in specifying the area in the 3rd row and the 1st column, and is recorded on the film as a bar code.

Condition C

In accordance With the framing of Condition B, the principal object is focussed, and thereafter the position of the principal object is similarly specified. Daylight synchronized flash photographing is performed with a predetermined flash (shutter speed 1/125 sec, f-number about 6.3).

Conditions A' to C'

Without operating the mechanism for recording the position of the principal object, a photograph is taken under photographing conditions similar to Conditions A to C as described above.

The film after photographing was processed according to the processing procedure shown in Table 2 to obtain a color negative film for printing.

Printing onto Color Paper by Use of Photographing Information

An improvement was made on a mini-lab system "Champion 23 Series 10M-type" (mechanism name; manufactured by FUJI PHOTO FILM CO., LTD.), which is equipped with the calculator unit 47 and the scanner mechanism (the scanner 50, the signal processing circuit 51 etc.) shown in FIG. 3. This mini-lab system was additionally provided with a reading unit (the reader 46) for reading the bar code recorded on the developed color negative film outside its recorded image.

The color negative film after photographing and processing from the samples (1) to (4) of color photosensitive material was placed on the film holder, and was printed onto Fujicolor HG Paper (merchandise name; manufactured by FUJI PHOTO FILM CO., LTD.).

2L-size prints were obtained through a standard color processing procedure for color paper shown in Table 3.

The control mechanism with reference to position information of a principal image was not operated for printing the color negative film obtained from Conditions A' to C'.

TABLE 3

| Process | Processing Time | Temp. | Amount of supply *1 | Tank volume |
|---|---|---|---|---|
| Color development | 45 sec | 35° C. | 161 ml | 17 l |
| Bleaching/Fixing | 45 sec | 30-35° C. | 215 ml | 17 l |
| Rinsing (1) | 20 sec | 30-35° C. | — | 10 l |
| Rinsing (2) | 20 sec | 30-35° C. | — | 10 l |
| Rinsing (3) | 20 sec | 30-35° C. | 350 ml | 10 l |
| Drying | 60 sec | 70-80° C. | | |

*1: Amount supplied per 1 m² of photosensitive material.

(Counterflow in cascade of the three tanks, from rinsing tank (3) to rinsing tank (1).)

Compositions of treatment solution are shown hereinbelow.

| | Solution in Tank | in Filler |
|---|---|---|
| Color Developer | | |
| water | 800 ml | 800 ml |
| ethylenediamine-N,N,N,N-tetra-methylene phosphonic acid | 1.5 g | 2.0 g |
| triethanolamine | 8.0 g | 12.0 g |
| sodium chloride | 1.4 g | — |
| potassium carbonate | 25 g | 25 g |
| N-ethyl-N- (β-methanesulfonamide ethyl)-3-methyl-4-N-aminoaniline sulfate | 5.0 g | 7.0 g |
| N,N-bis (carboxymethyl) hydrazin | 1.0 g | 2.0 g |
| fluorescent brightening agent (WHITEX 4B, Sumitomo Chem. Co.) | | |
| add water to | 1000 ml | 1000 ml |
| pH (25° C.) | 10.05 | 10.45 |
| Bleaching Fixer (Solution in Tank and Filler is equal content.) | | |
| water | 400 ml | |
| ammonium thiosulfate (70%) | 100 ml | |
| sodium sulfite | 17 g | |
| ferric ethylenediamine tetraacetate ammonium | 55 g | |
| ethylenediamine tetraacetic acid disodium salt | 5 g | |
| ammonium bromide | 40 g | |
| add water to | 1000 ml | |
| pH (25° C.) | 6.0 | |

Rinsing Solution (Solution in Tank and Filler is equal content.)

Ion exchange water (calcium and magnesium is equal to or below 3 ppm each).

Evaluation of the Photographic Prints

The results are shown in Table 4 according to an evaluation in which the gradation and reproduced color of the principal object (the woman, grass, flowers, and Macbeth color chart) are evaluated by seven panelists on the basis of inspecting the principal object.

The advantages of the present invention specially appear under Condition C. The samples (1) and (4) in particular show that the gradation and reproduced color of the principal object are very good, and that the image of the photograph is excellent in spite of an under-exposure of the background scene.

TABLE 4

| Sample number of photo-sensitive material | Photographing condition | Correction in printing according to principal object position information | Degree of satisfaction at quality of prints |
|---|---|---|---|
| Super HR-100 (comparative example) | A | ○ | 4.5 |
| | A' | X | 4 |
| | B | ○ | 4.5 |
| | B' | X | 3.5 |
| | C | ○ | 3 |
| | C' | X | 2 |
| (1) | A | ○ | 4.5 |
| | A' | X | 4 |
| | B | ○ | 4.5 |
| | B' | X | 3.5 |
| | C | ○ | 5 |
| | C' | X | 3 |
| (4) | A | ○ | 5 |
| | A' | X | 4.5 |
| | B | ○ | 5 |
| | B' | X | 3.5 |
| | C | ○ | 5 |
| | C' | X | 3 |
| (2) | B | ○ | 4.5 |
| | B' | X | 3 |
| | C | ○ | 2.5 |
| | C' | X | 2 |
| (3) | B | ○ | 4.5 |
| | B' | X | 3.5 |
| | C | ○ | 3 |
| | C' | X | 2.5 |

Degree of satisfaction (on evaluation by seven panelists). 5: satisfactory; 4: nearly satisfactory; 3: normal; 2: unsatisfactory. 4.5, 3.5 and 2.5 indicate intermediate degrees.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. In a camera for taking a scene by performing range finding for a principal subject within a range finding area of a finder view field at a first stage of release member actuation and operating a shutter at a second stage of release member actuation; an apparatus for recording the position information of a principal image, said apparatus comprising:
- an image sensor for outputting a time sequential signal by taking a subject;
- a memory for storing said time sequential signal outputted from said image sensor at the time of range finding;
- means for comparing said time sequential signal stored in said memory with a time sequential signal outputted in real time from said image sensor so as to detect said position of said principal subject within said frame; and
- means for recording information on a recording medium, said information representative of said position of said principal subject being detected at the time of photographing.

2. An apparatus according to claim 1, wherein said image sensor is a line image sensor.

3. An apparatus according to claim 1, wherein said image sensor is an image area sensor.

4. In a camera for taking a scene by performing range finding for a principal subject within a range finding area of a finder view field at a first stage of release member actuation and operating a shutter at a second stage of release member actuation: an apparatus for recording the position information of a principal image, said apparatus comprising:
- an area image sensor having a plurality of divided areas of which a central one of said divided areas is used for range finding;
- a memory for storing a time sequential signal of a principal subject outputted from said range finding area at the time of range finding;
- means for comparing said time sequential signal stored in said memory with time sequential signals from said respective divided areas so as to determine an area where said principal subject is present; and
- means for recording a code on a recording medium, said code being representative of said area where said principal subject is present at the time of photographing.

* * * * *